United States Patent
Chen et al.

(10) Patent No.: US 12,014,131 B2
(45) Date of Patent: *Jun. 18, 2024

(54) INTEGRATED CIRCUIT AND METHOD OF FORMING SAME AND A SYSTEM

(71) Applicant: TAIWAN SEMICONDUCTOR MANUFACTURING COMPANY, LTD., Hsinchu (TW)

(72) Inventors: Sheng-Hsiung Chen, Hsinchu (TW); Wen-Hao Chen, Hsinchu (TW); Hung-Chih Ou, Hsinchu (TW); Chun-Yao Ku, Hsinchu (TW); Shao-Huan Wang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.
This patent is subject to a terminal disclaimer.

(21) Appl. No.: 18/337,245

(22) Filed: Jun. 19, 2023

(65) Prior Publication Data
US 2023/0334219 A1     Oct. 19, 2023

Related U.S. Application Data

(63) Continuation of application No. 17/692,767, filed on Mar. 11, 2022, now Pat. No. 11,681,853, which is a
(Continued)

(51) Int. Cl.
*G06F 30/30* (2020.01)
*G06F 30/3315* (2020.01)
(Continued)

(52) U.S. Cl.
CPC ........ *G06F 30/398* (2020.01); *G06F 30/3315* (2020.01); *G06F 30/337* (2020.01);
(Continued)

(58) Field of Classification Search
None
See application file for complete search history.

(56) References Cited

U.S. PATENT DOCUMENTS

| 7,260,442 B2 | 8/2007 | Hwang et al. |
| 9,177,096 B2 | 11/2015 | Sundareswaran et al. |
| | (Continued) | |

FOREIGN PATENT DOCUMENTS

| CN | 105897221 | 8/2016 |
| CN | 108092660 | 5/2018 |
| | (Continued) | |

OTHER PUBLICATIONS

R.P. Pokala et al., "Physical Synthesis for Performance Optimization," Fifth Annual IEEE International ASIC Conference and Exhibit, Sep. 1992, pp. 34-37. DOI: 10.1109/ASIC.1992.270312 (Year: 1992).
(Continued)

*Primary Examiner* — Leigh M Garbowski
(74) *Attorney, Agent, or Firm* — Hauptman Ham, LLP

(57) ABSTRACT

A multi-bit flip-flop includes a first flip-flop, a second flip-flop and a first inverter. The first flip-flop has a first driving capability, and includes a first reset pin configured to receive a first reset signal. The second flip-flop has a second driving capability different from the first driving capability. The second flip-flop includes a second reset pin configured to receive the first reset signal, and the first reset pin and the second reset pin are coupled together. The first inverter is configured to receive a first clock signal on a first clock pin, and configured to generate a second clock signal inverted from the first clock signal. The first flip-flop and the second flip-flop are configured to share at least the first clock pin.

20 Claims, 10 Drawing Sheets

Related U.S. Application Data continuation of application No. 17/235,262, filed on Apr. 20, 2021, now Pat. No. 11,275,886, which is a continuation of application No. 16/559,534, filed on Sep. 3, 2019, now Pat. No. 10,990,745.

(60) Provisional application No. 62/733,878, filed on Sep. 20, 2018.

(51) Int. Cl.
*G06F 30/337* (2020.01)
*G06F 30/396* (2020.01)
*G06F 30/398* (2020.01)
G06F 30/392 (2020.01)
G06F 115/06 (2020.01)
G06F 119/06 (2020.01)
G06F 119/12 (2020.01)

(52) U.S. Cl.
CPC .......... *G06F 30/396* (2020.01); *G06F 30/392* (2020.01); *G06F 2115/06* (2020.01); *G06F 2119/06* (2020.01); *G06F 2119/12* (2020.01)

(56) References Cited

U.S. PATENT DOCUMENTS

| | | | |
|---|---|---|---|
| 9,256,709 | B2 | 2/2016 | Yu et al. |
| 9,361,417 | B2 | 6/2016 | Arunachalam et al. |
| 9,513,658 | B2 | 12/2016 | Krishnamurthy et al. |
| 9,667,230 | B1 | 5/2017 | Fojtik et al. |
| 10,338,139 | B1 | 7/2019 | Ge et al. |
| 10,641,822 | B2 | 5/2020 | Balasbrumanian et al. |
| 10,958,252 | B2 | 3/2021 | Wu et al. |
| 10,990,745 | B2 | 4/2021 | Chen et al. |
| 11,275,886 | B2 | 3/2022 | Chen et al. |
| 11,681,853 | B2 * | 6/2023 | Chen .................. G06F 30/3315 716/52 |
| 2003/0014612 | A1 | 1/2003 | Joy et al. |
| 2014/0040838 | A1 | 2/2014 | Liu et al. |
| 2015/0227646 | A1 | 8/2015 | Arunachalam et al. |
| 2015/0278429 | A1 | 10/2015 | Chang |
| 2015/0318845 | A1 | 11/2015 | Pasternak |
| 2016/0241219 | A1 | 8/2016 | Kim et al. |
| 2016/0266604 | A1 | 9/2016 | Krishnamurthy et al. |
| 2017/0045576 | A1 | 2/2017 | Balasubramanian et al. |
| 2017/0063350 | A1 | 3/2017 | Cheng et al. |
| 2017/0292993 | A1 | 10/2017 | Yoon et al. |
| 2018/0131351 | A1 | 5/2018 | Lee et al. |

FOREIGN PATENT DOCUMENTS

| | | |
|---|---|---|
| JP | 2007173509 | 7/2007 |
| JP | 2013182600 | 9/2013 |
| TW | 201630352 | 8/2016 |

OTHER PUBLICATIONS

S.-H. Wang et al., "Power-Driven Flip-Flop Merging and Relocation," IEEE Trans. on Computer-Aided Design of Integrated Circuits and Systems, vol. 31, No. 2, Feb. 2012, pp. 180-191. (Year: 2012).

G. Barathi et al., "Lower Power High Speed Memory Architecture Using Multi-bit Flip-Flops," Int'l Journal of Advanced Information Science and Technology (IJAIST), vol. 13, No. 13, May 2013, pp. 117-126. (Year: 2013).

C.-C. Lu et al., "Slack Budgeting and Slack to Length Converting for Multi-bit Flip-Flop Merging," 2013 EDAA, IEEE, 6 pages. (Year: 2013).

S. Sharma et al., "Shift Register Design Using Two Bit Flip-Flop," Proc. of 2014 RAECS UIET Panjab University Chandigarh, IEEE, 5 pages. (Year: 2014).

A. Abinaya et al., "Efficient Flip-Flop Merging Technique for Clock Power Reduction," IEEE Sponsored 2nd Int'l Conference on Electronics and Communication System (ICECS 2015), pp. 326-330. (Year: 2015).

D. Gluzer et al., "Probability-Driven Multibit Flip-Flop Integration With Clock Gating," IEEE Trans. on Very Large Scale Integration (VLSI) Systems, vol. 25, No. 3, Mar. 2017, pp. 1173-1177. (Year: 2017).

Office Action dated Jan. 7, 2022 for corresponding case No. TW 11120031400. (pp. 1-4).

Santos, Cristiano et al., "Multi-Bit Flip-Flop Usage Impact on Physical Synthesis", State Intellectual Property Office of China, Donwloaded on Mar. 18, 2024, IEEE Xplore, 6 pages.

* cited by examiner

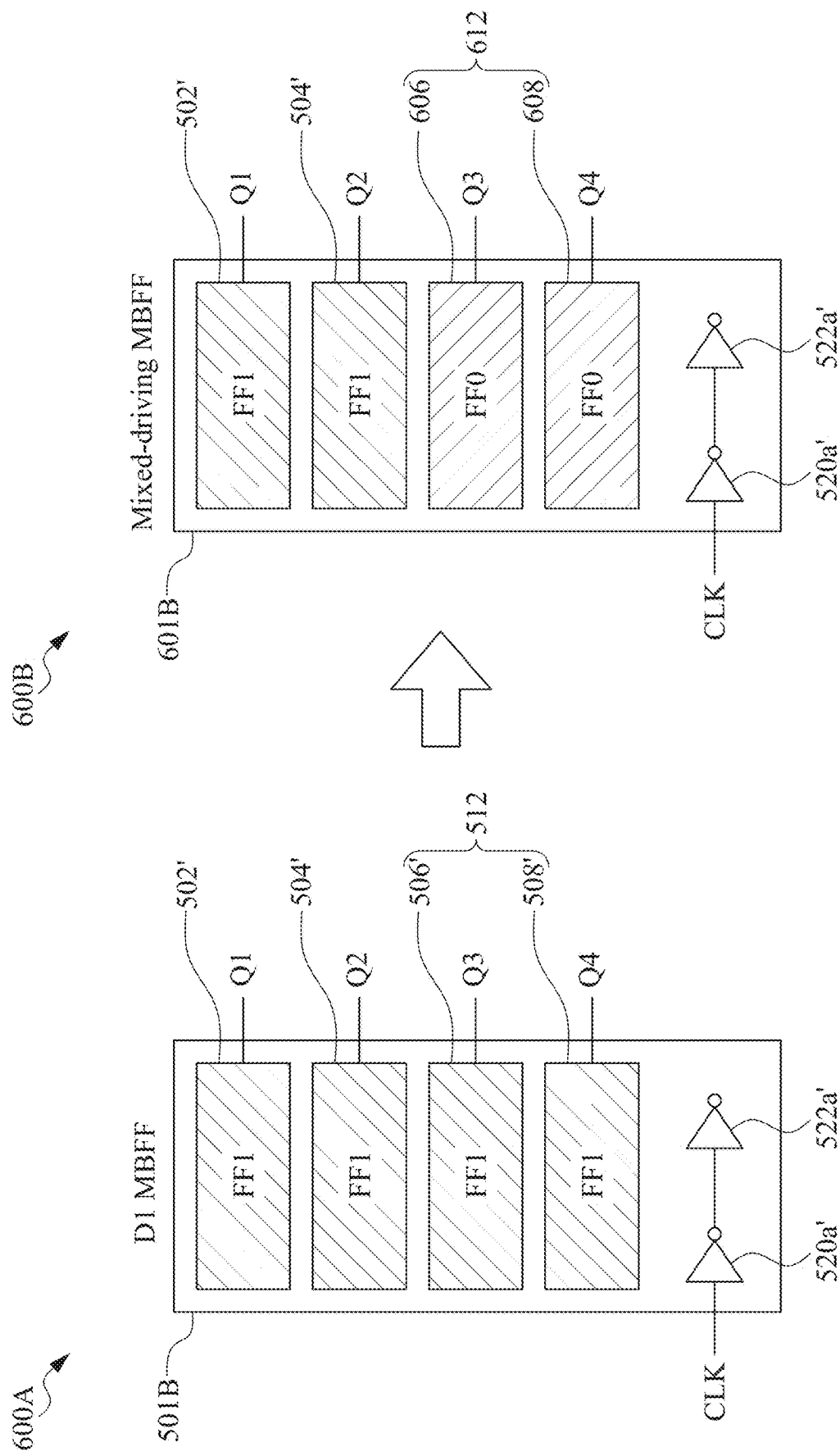

INTEGRATED CIRCUIT AND METHOD OF FORMING SAME AND A SYSTEM

PRIORITY CLAIM

This application is a continuation of U.S. application Ser. No. 17/692,767, filed Mar. 11, 2022, now U.S. Pat. No. 11,681,853, issued Jun. 20, 2023, which is a continuation of U.S. application Ser. No. 17/235,262, filed Apr. 20, 2021, now U.S. Pat. No. 11,275,886, issued Mar. 15, 2022, which is a continuation of U.S. application Ser. No. 16/559,534, filed Sep. 3, 2019, now U.S. Pat. No. 10,990,745, issued Apr. 27, 2021, which claims the benefit of U.S. Provisional Application No. 62/733,878, filed Sep. 20, 2018, which are herein incorporated by reference in their entireties.

BACKGROUND

The semiconductor integrated circuit (IC) industry has produced a wide variety of digital devices to address issues in a number of different areas. Some of these digital devices, such as level shifter circuits, are configured to enable operation of circuits capable of operation in different voltage domains. As ICs have become smaller and more complex, operating voltages of these digital devices continue to decrease affecting IC performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 6A-6D are schematic views of layout diagrams of flip-flops before and after modifications, in accordance with some embodiments.

DETAILED DESCRIPTION

Figure 1:
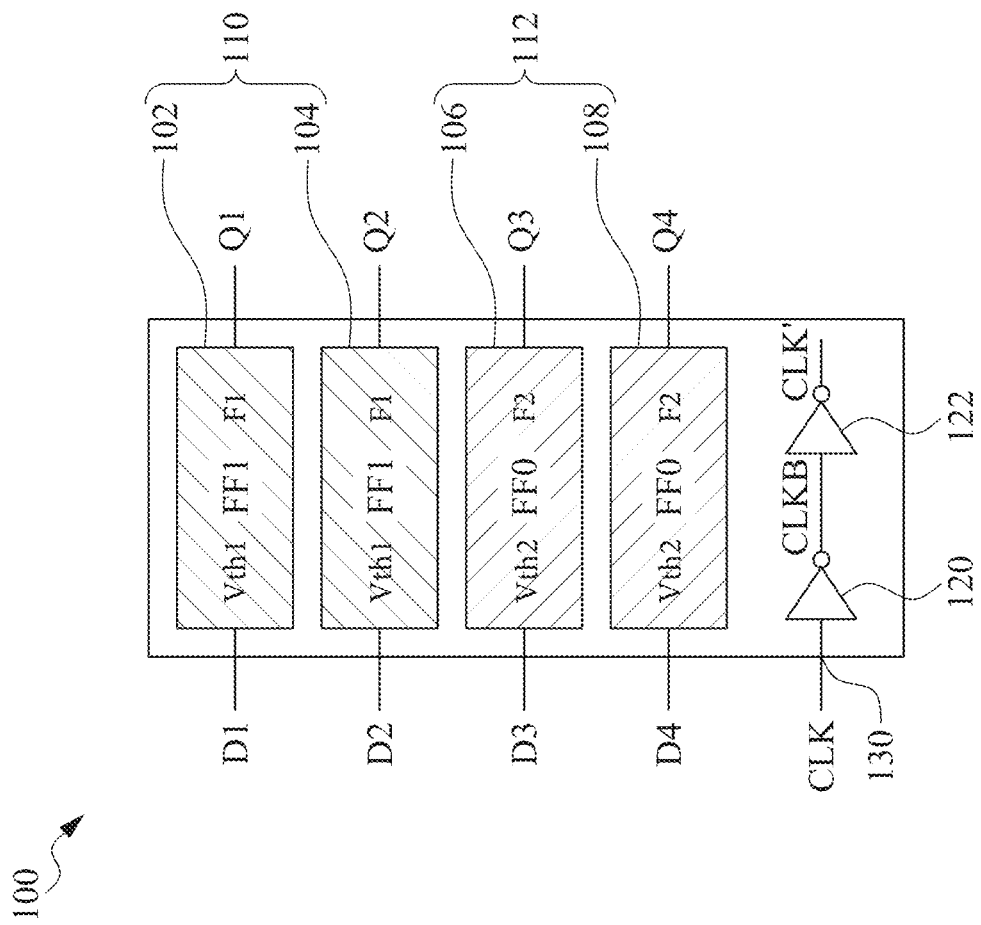
FIG. 1 is a schematic diagram of a multi-bit flip-flop, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, an integrated circuit includes a first flip-flop and a second flip-flop. The first flip-flop has a first driving current capability. The second flip-flop has a second driving current capability different from the first driving current capability. The first flip-flop and the second flip-flop are part of a multibit flip-flop (MBFF) configured to share at least a first clock pin. The first clock pin is configured to receive the first clock signal. In some embodiments, by configuring the first flip-flop and the second flip-flop with different driving current capabilities, the MBFF is a mixed driving multi-bit flip-flop.

In some embodiments, the first driving current capability of the first flip-flop is based on a first number of fins in one or more transistors in the first flip-flop. In some embodiments, the second driving current capability of the second flip-flop is based on a second number of fins in one or more transistors in the second flip-flop. In some embodiments, the second number of fins is different from the first number of fins.

In some embodiments, the first driving current capability of the first flip-flop is based on a first threshold voltage of one or more transistors in the first flip-flop. In some embodiments, the second driving current capability of the second flip-flop is based on a second threshold voltage of one or more transistors in the second flip-flop. In some embodiments, the second threshold voltage is different from the first threshold voltage.

In some embodiments, by configuring the MBFF as a mixed driving multi-bit flip-flop, a number of duplicate inverters in the clock path of the MBFF are reduced resulting in the MBFF having less input pins for a corresponding clock signal, and the MBFF occupies less area compared with other approaches.

In some embodiments, by configuring the MBFF as a mixed driving multi-bit flip-flop, a number of duplicate inverters in the clock path of the MBFF are reduced resulting in a lower total clock dynamic power consumption compared with other approaches. In some embodiments, by configuring the MBFF as a mixed driving multi-bit flip-flop, the power consumption of each flip-flop in the MBFF is optimized compared with other approaches.

Furthermore, in some embodiments, by configuring the MBFF as a mixed driving multi-bit flip-flop, the power consumption of each flip-flop in the MBFF is optimized as flip-flops that may be debanked in the design flow order to fix timing violations in other approaches, are upsized or downsized in the design flow within the same MBFF rather than being debanked to another flip-flop as in the other approaches.

Multi-Bit Flip-Flop

FIG. 1 is a schematic diagram of a multi-bit flip-flop (MBFF) 100, in accordance with some embodiments.

MBFF 100 comprises a flip-flop 102, a flip-flop 104, a flip-flop 106, a flip-flop 108, an inverter 120, an inverter 122 and a clock input pin 130. MBFF 100 is a four bit flip-flop. In other words, MBFF includes four flip-flops (e.g., flip-flops 102, 104, 106 and 108). Other numbers of bits or corresponding flip-flops in MBFF 100 are within the scope of the present disclosure. In some embodiments, MBFF 100 is part of an integrated circuit (not shown) that includes other MBFF's, similar to MBFF 100, or one or more other flip-flops.

MBFF 100 is configured to receive input signals D1, D2, D3 and D4, and to receive clock signal CLK on the clock input pin 130. MBFF 100 is configured to generate output signals Q1, Q2, Q3 and Q4.

Flip-flops 102, 104, 106 and 108 are configured to receive corresponding input signals D1, D2, D3 and D4 on corresponding input terminals (not labelled). Flip-flops 102, 104, 106 and 108 are configured to generate corresponding output signals Q1, Q2, Q3 and Q4, and to output the corresponding output signals Q1, Q2, Q3 and Q4 on corresponding output terminals (not labelled).

Each of flip-flops 102, 104, 106 and 108 is further configured (not shown) to receive clock signal CLK and inverted clock signal CLKB. Each of flip-flops 102, 104, 106 and 108 is coupled to inverters 120 and 122. In some embodiments, each of flip-flops 102, 104, 106 and 108 is configured (not shown) to share input pin 130. Each of flip-flops 102, 104, 106 and 108 is further configured to receive clock signal CLK from input pin 130, and is configured to receive inverted clock signal CLKB from inverter 120. In some embodiments, each of flip-flops 102, 104, 106 and 108 are configured to receive clock signal CLK' from inverter 122. In some embodiments, clock signal CLK' is a buffered version of clock signal CLK. In some embodiments, inverted clock signal CLKB is inverted from the clock signal CLK.

In some embodiments, one or more of flip-flops 102, 104, 106 and 108 are edge triggered flip-flops. In some embodiments, one or more of flip-flops 102, 104, 106 and 108 includes a DQ flip-flop, an SR-flip-flop, a T flip-flop, a JK flip-flop, or the like. Other types of flip-flops or configurations for at least flip-flop 102, 104, 106 or 108 are within the scope of the present disclosure.

An input terminal of inverter 120 is coupled to the clock input pin 130, and is configured to receive clock signal CLK. An output terminal of inverter 120 is coupled to an input terminal of inverter 122 and is configured to output inverted clock signal CLKB.

An input terminal of inverter 122 is configured to receive inverted clock signal CLKB. An output terminal of inverter 120 is configured to output clock signal CLK'. Other configurations for at least inverter 120 or 122 are within the scope of the present disclosure.

MBFF 100 is configured as a mixed driving multi-bit flip-flop. For example, MBFF 100 includes flip-flops configured with at least two different driving current capabilities. In some embodiments, each of the flip-flops contained in MBFF 100 are configured to have different driving current capability. Other numbers of different driving current capabilities for MBFF 100 are within the scope of the present disclosure. For example, in some embodiments, MBFF 100 includes three different flip-flops, each of the three different flip-flops is configured with a different driving current capability from the other.

Flip-flop 102 and flip-flop 104 (collectively referred to as "a set of flip-flops 110") are each configured to have a first driving current capability FF1. In some embodiments, the first driving current capability FF1 corresponds to the driving current conducted by at least flip-flop 102 or flip-flop 104.

Flip-flop 106 and flip-flop 108 (collectively referred to as "a set of flip-flops 112") are each configured to have a second driving current capability FF0. In some embodiments, the second driving current capability FF0 corresponds to the driving current conducted by at least flip-flop 106 or flip-flop 108. In some embodiments, the second driving current capability FF0 is different from the first driving current capability FF1.

In some embodiments, the first driving current capability FF1 of at least flip-flop 102 or flip-flop 104 is based on a first number of fins F1 in one or more transistors in flip-flop 102 or flip-flop 104.

In some embodiments, the second driving current capability FF0 of at least flip-flop 106 or flip-flop 108 is based on a second number of fins F2 in one or more transistors in flip-flop 106 or flip-flop 108. In some embodiments, the first number of fins F1 is different from the second number of fins F2. In some embodiments, at least the first number of fins F1 or the second number of fins F2 includes a single fin. In some embodiments, at least the first number of fins F1 or the second number of fins F2 includes multiple fins. In some embodiments, the use of multiple fins increases channel width and current driving strength of the transistors in the set of flip-flops 110 or 112. In some embodiments, additional fins are used to add further current driving strength, and these arrangements are within the scope of the present disclosure.

In some embodiments, the first number of fins F1 and the first driving current capability FF1 have a direct relationship. For example, in some embodiments, as the first number of fins F1 in one or more transistors in flip-flop 102 or flip-flop 104 is increased, the first driving current capability FF1 is also increased. For example, in some embodiments, as the first number of fins F1 in one or more transistors in flip-flop 102 or flip-flop 104 is decreased, the first driving current capability FF1 is also decreased.

In some embodiments, the second number of fins F2 and the second driving current capability FF0 have a direct relationship. For example, in some embodiments, as the second number of fins F2 in one or more transistors in flip-flop 106 or flip-flop 108 is increased, the second driving current capability FF0 is also increased. For example, in some embodiments, as the second number of fins F2 in one or more transistors in flip-flop 106 or flip-flop 108 is decreased, the second driving current capability FF0 is also decreased.

Thus, by adjusting the first number of fins F1 in at least flip-flop 102 or flip-flop 104 to be different from the second number of fins F2 in at least flip-flop 106 or flip-flop 108, the first driving current capability FF1 and the second current driving capability FF0 are also adjusted.

In some embodiments, the first driving current capability FF1 of at least flip-flop 102 or flip-flop 104 is based on a first threshold voltage Vth1 of one or more transistors in flip-flop 102 or flip-flop 104.

In some embodiments, the second driving current capability FF0 of at least flip-flop 106 or flip-flop 108 is based on a second threshold voltage Vth2 of one or more transistors in flip-flop 106 or flip-flop 108. In some embodiments, the first threshold voltage Vth1 is different from the second threshold voltage Vth2. In some embodiments, the first threshold voltage Vth1 is at least a high threshold voltage (HVT), a low threshold voltage (LVT) or a standard threshold voltage (SVT). In some embodiments, HVT is greater than at least LVT or SVT. In some embodiments, SVT is greater than LVT. In some embodiments, the second threshold voltage Vth2 is at least HVT, LVT or SVT.

In some embodiments, the first threshold voltage Vth1 and the first driving current capability FF1 have an inverse relationship. For example, in some embodiments, as the first threshold voltage Vth1 of one or more transistors in flip-flop 102 or flip-flop 104 is increased, the first driving current capability FF1 is decreased. For example, in some embodiments, as the first threshold voltage Vth1 of one or more transistors in flip-flop 102 or flip-flop 104 is decreased, the first driving current capability FF1 is increased.

In some embodiments, the second threshold voltage Vth2 and the second driving current capability FF0 have an inverse relationship. For example, in some embodiments, as the second threshold voltage Vth2 of one or more transistors in flip-flop 106 or flip-flop 108 is increased, the second driving current capability FF0 is decreased. For example, in some embodiments, as the second threshold voltage Vth2 of one or more transistors in flip-flop 106 or flip-flop 108 is decreased, the second driving current capability FF0 is increased.

In some embodiments, the first threshold voltage Vth1 is dependent upon at least an oxide thickness or an oxide material of the transistors in the set of flip-flops 110, a doping profile of the transistors in the set of flip-flops 110, a transistor device geometry including a channel width of the transistors in the set of flip-flops 110, a transistor size of the transistors in the set of flip-flops 110, or the like.

In some embodiments, the second threshold voltage Vth2 is dependent upon at least an oxide thickness or an oxide material of the transistors in the set of flip-flops 112, a doping profile of the transistors in the set of flip-flops 112, a transistor device geometry including a channel width of the transistors in the set of flip-flops 112, a transistor size of the transistors in the set of flip-flops 112, or the like.

In some embodiments, by configuring MBFF 100 as a mixed driving multi-bit flip-flop, a number of duplicate inverters in the clock path of MBFF 100 are reduced resulting in MBFF 100 having less input pins for a corresponding clock signal, and MBFF 100 occupying less area compared with other approaches.

In some embodiments, by configuring MBFF 100 as a mixed driving multi-bit flip-flop, a number of duplicate inverters in the clock path of MBFF 100 are reduced resulting in a lower total clock dynamic power consumption compared with other approaches. In some embodiments, by configuring MBFF 100 as a mixed driving multi-bit flip-flop, the power consumption of each flip-flop in MBFF 100 is optimized compared with other approaches.

Furthermore, in some embodiments, by configuring MBFF 100 as a mixed driving multi-bit flip-flop, the power consumption of each flip-flop in MBFF 100 is optimized as flip-flops that may be debanked in order to fix timing violations in other approaches, are upsized or downsized within the same MBFF rather than being debanked to another flip-flop as in the other approaches. In other words, in some embodiments, MBFF 100 can maintain the benefits of being part of a multi-bit flip-flop without the timing violations or the extra power consumption of other approaches.

Figure 2A:
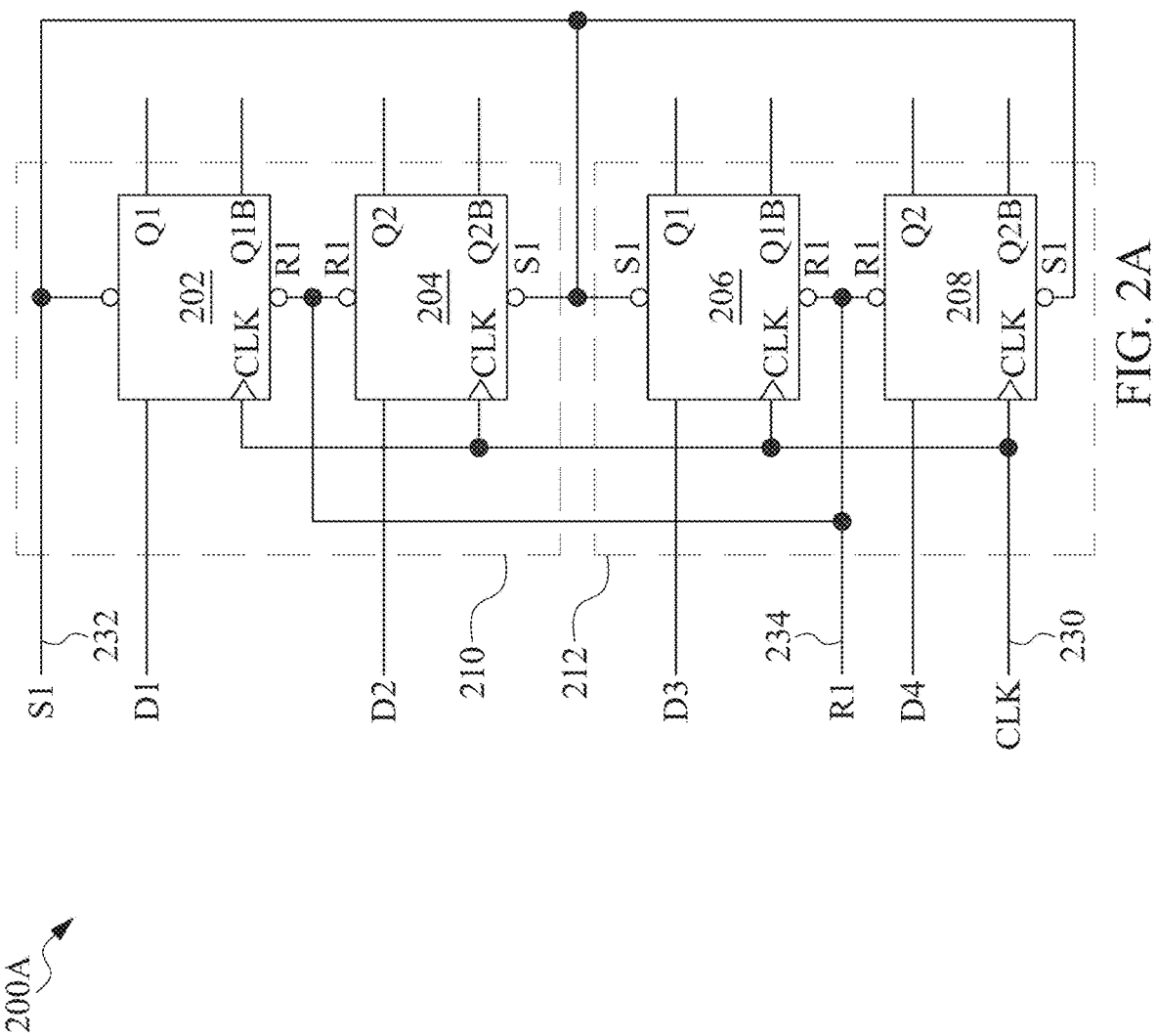
FIG. 2A is a circuit diagram of a circuit, in accordance with some embodiments.

FIG. 2A is a circuit diagram of a circuit 200A, in accordance with some embodiments.

Circuit 200A is an embodiment of MBFF 100 of FIG. 1. In some embodiments, circuit 200A or circuit 200B (FIG. 2B) is an MBFF circuit. In some embodiments, circuit 200A or circuit 200B are part of an integrated circuit.

Circuit 200A comprises a flip-flop 202, a flip-flop 204, a flip-flop 206, a flip-flop 208, a clock input pin 230, a set input pin 232 and a reset input pin 234.

Circuit 200A is a four bit flip-flop, and each bit is associated with a corresponding flip-flop (e.g., flip-flops 202, 204, 206 and 208). In other words, circuit 200A includes four flip-flops (e.g., flip-flops 202, 204, 206 and 208). Other numbers of bits or numbers of corresponding flip-flops in circuit 200A are within the scope of the present disclosure. In some embodiments, circuit 200A is part of an integrated circuit (not shown) that includes other MBFFs, similar to MBFF 100, or one or more other flip-flops.

Flip-flop 202 and flip-flop 204 (collectively referred to as "a set of flip-flops 210") are each configured to have the first driving current capability FF1. In some embodiments, the first driving current capability FF1 corresponds to the driving current conducted by at least flip-flop 202 or flip-flop 204.

Flip-flop 206 and flip-flop 208 (collectively referred to as "a set of flip-flops 212") are each configured to have the second driving current capability FF0. In some embodiments, the second driving current capability FF0 corresponds to the driving current conducted by at least flip-flop 206 or flip-flop 208.

Flip-flops 202, 204, 206 and 208 are embodiments of corresponding flip-flops 102, 104, 106 and 108 of FIG. 1, and similar detailed description is omitted. Set of flip-flops 210 and 212 are embodiments of corresponding set of flip-flops 110 and 112 of FIG. 1, and similar detailed description is omitted. Clock input pin 230 is an embodiment of clock input pin 130 of FIG. 1, and similar detailed description is omitted.

Each of flip-flops 202, 204, 206 and 208 are a DQ flip-flop. In some embodiments, one or more of flip-flops 202, 204, 206 and 208 includes an SR-flip-flop, a T flip-flop, a JK flip-flop, or the like. Other types of flip-flops or configurations for at least flip-flop 202, 204, 206 and 208 are within the scope of the present disclosure.

Each of flip-flops 202, 204, 206 and 208 has a corresponding clock input terminal configured to receive clock signal CLK, a corresponding set input terminal configured to receive a set signal S1, and a corresponding reset input terminal configured to receive a reset signal R1.

In some embodiments, each of flip-flops 202, 204, 206 and 208 is configured to share the clock input pin 230, a set input pin 232 and a reset input pin 234. Each of flip-flops 202, 204, 206 and 208 is configured to receive the clock signal CLK from input pin 230, is configured to receive the set signal S1 from the set input pin 232, and is configured to receive the reset signal R1 from reset input pin 234. In some embodiments, the set input terminals of flip-flops 202, 204, 206 and 208 are coupled together and configured to receive the set signal S1 from the set input pin 232. In some embodiments, the reset input terminals of flip-flops 202, 204, 206 and 208 are coupled together and configured to receive the reset signal R1 from the set input pin 234.

Figure 2B:
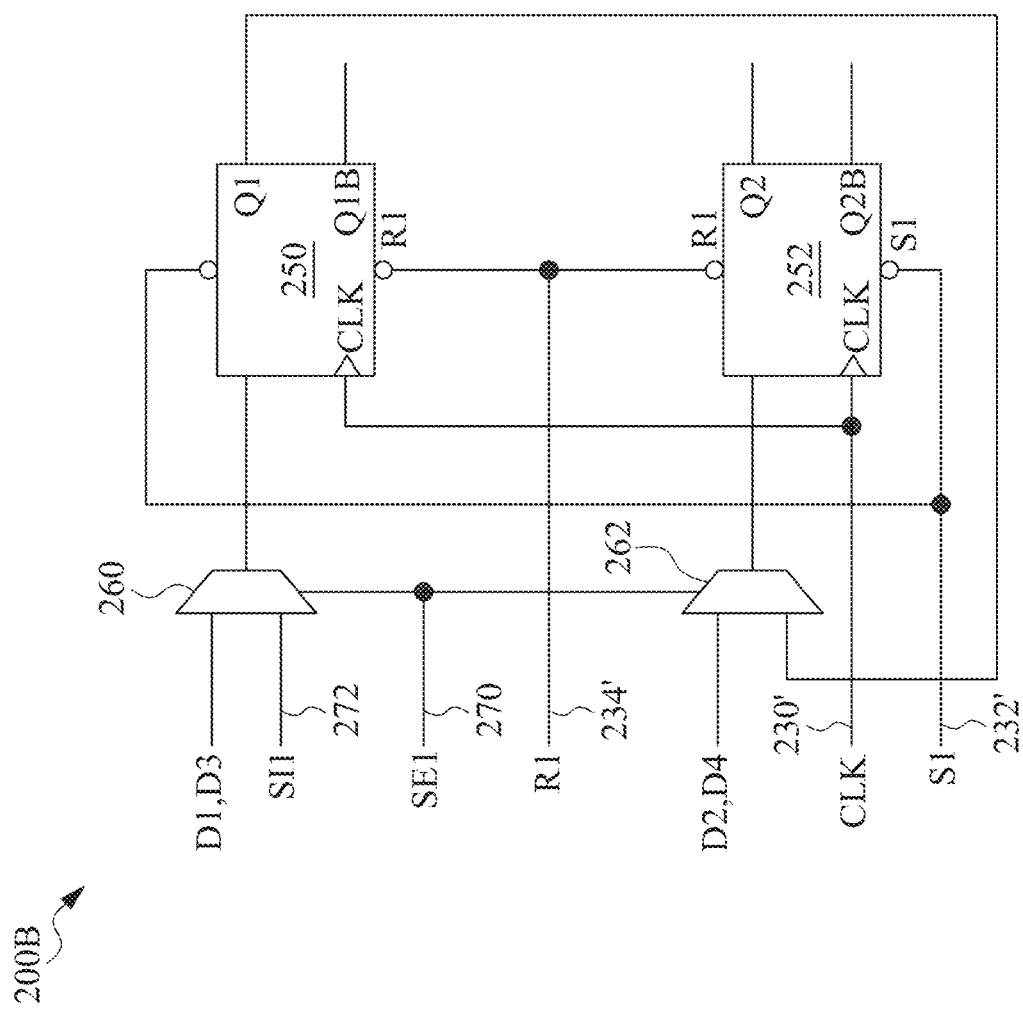
FIG. 2B is a circuit diagram of a circuit, in accordance with some embodiments.

FIG. 2B is a circuit diagram of a circuit 200B, in accordance with some embodiments.

Circuit 200B is an embodiment of circuit 100 of FIG. 1.

Circuit 200B is a variation of circuit 200A, and similar detailed description is therefore omitted. For example, circuit 200B illustrates an example of where circuit 200B includes a 2 bit, scan chain multi-bit flip-flop.

Components that are the same or similar to those in one or more of FIGS. 1, 2A-2B, 5A-5B and 6A-6D (shown below) are given the same reference numbers, and detailed description thereof is thus omitted.

Circuit 200B comprises a flip-flop 250, a flip-flop 252, a multiplexer 260, a multiplexer 262, a clock input pin 230', a set input pin 232', a reset input pin 234', a scan enable pin 270 and a scan in pin 272.

Circuit 200B is a 2 bit MBFF arranged in a scan chain configuration. Each bit in circuit 200B is associated with a corresponding flip-flop (e.g., flip-flops 250 and 252). In other words, circuit 200B includes two flip-flops (e.g., flip-flops 250 and 252). Other numbers of bits or numbers of corresponding flip-flops in circuit 200B are within the scope of the present disclosure. In some embodiments, circuit 200B is part of an integrated circuit (not shown) that includes other MBFFs, similar to MBFF 100, or one or more other flip-flops.

Flip-flop 250 is an embodiment of flip-flop 102 or 106 of FIG. 1, flip-flop 252 is an embodiment of flip-flop 104 or 108 of FIG. 1, and similar detailed description is omitted. Clock input pin 230' is an embodiment of clock input pin 130 of FIG. 1 or clock input pin 230 of FIG. 2A, set input pin 232' is an embodiment of set input pin 232 of FIG. 2A, reset input pin 234' is an embodiment of reset input pin 234 of FIG. 2A, and similar detailed description is omitted.

Flip-flop 250 and flip-flop 252 are each configured to have the first driving current capability FF1 or the second driving current capability FF0.

Each of flip-flops 250 or 252 are a DQ flip-flop. In some embodiments, one or more of flip-flops 250 or 252 includes an SR-flip-flop, a T flip-flop, a JK flip-flop, or the like. Other types of flip-flops or configurations for at least flip-flop 250 or 252 are within the scope of the present disclosure.

Each of flip-flops 250 or 252 has a corresponding clock input terminal configured to receive clock signal CLK, a corresponding set input terminal configured to receive a set signal S1, and a corresponding reset input terminal configured to receive a reset signal R1.

In some embodiments, each of flip-flops 250 and 252 is configured to share the clock input pin 230', a set input pin 232' and a reset input pin 234'. Each of flip-flops 250 and 252 is configured to receive the clock signal CLK from input pin 230', is configured to receive the set signal S1 from the set input pin 232', and is configured to receive the reset signal R1 from reset input pin 234'. In some embodiments, the set input terminals of flip-flops 250 and 252 are coupled together and configured to receive the set signal S1 from the set input pin 232'. In some embodiments, the reset input terminals of flip-flops 250 and 252 are coupled together and configured to receive the reset signal R1 from the set input pin 234'.

Multiplexer 260 has a first input terminal configured to receive input signal D1 or D3, a second input terminal configured to receive scan in signal SI1, a third input terminal configured to receive the scan enable signal SE1, and an output terminal configured to output the input signal of flip-flop 250 (e.g., signal D1, D3 or SI1).

Multiplexer 262 has a first input terminal configured to receive input signal D2 or D4, a second input terminal configured to receive output signal Q1 from flip-flop 250, a third input terminal configured to receive the scan enable signal SE1, and an output terminal configured to output the input signal of flip-flop 252 (e.g., signal D2, D4 or Q1).

In some embodiments, multiplexers 260 and 262 are coupled to and configured to share the scan enable input pin 270. In some embodiments, the third terminals of multiplexer 260 and 262 are coupled together and configured to receive the scan enable signal SE1 from the scan enable input pin 270.

The first input terminal of multiplexer 260 is configured to receive input signal D1 or D3, and the first input terminal of multiplexer 262 is configured to receive input signal D2 or D4 based on whether flip-flop 250 corresponds to an embodiment of flip-flop 102 or 106 of FIG. 1, and whether flip-flop 252 corresponds to an embodiment of flip-flop 104 or 108 of FIG. 1. For example, if flip-flop 250 is an embodiment of flip-flop 102, then the first input terminal of multiplexer 260 is configured to receive input signal D1, and if flip-flop 252 is an embodiment of flip-flop 104, then the first input terminal of multiplexer 262 is configured to receive input signal D2. For example, if flip-flop 250 is an embodiment of flip-flop 106, then the first input terminal of multiplexer 260 is configured to receive input signal D3, and if flip-flop 252 is an embodiment of flip-flop 108, then the first input terminal of multiplexer 262 is configured to receive input signal D4.

Figure 3:
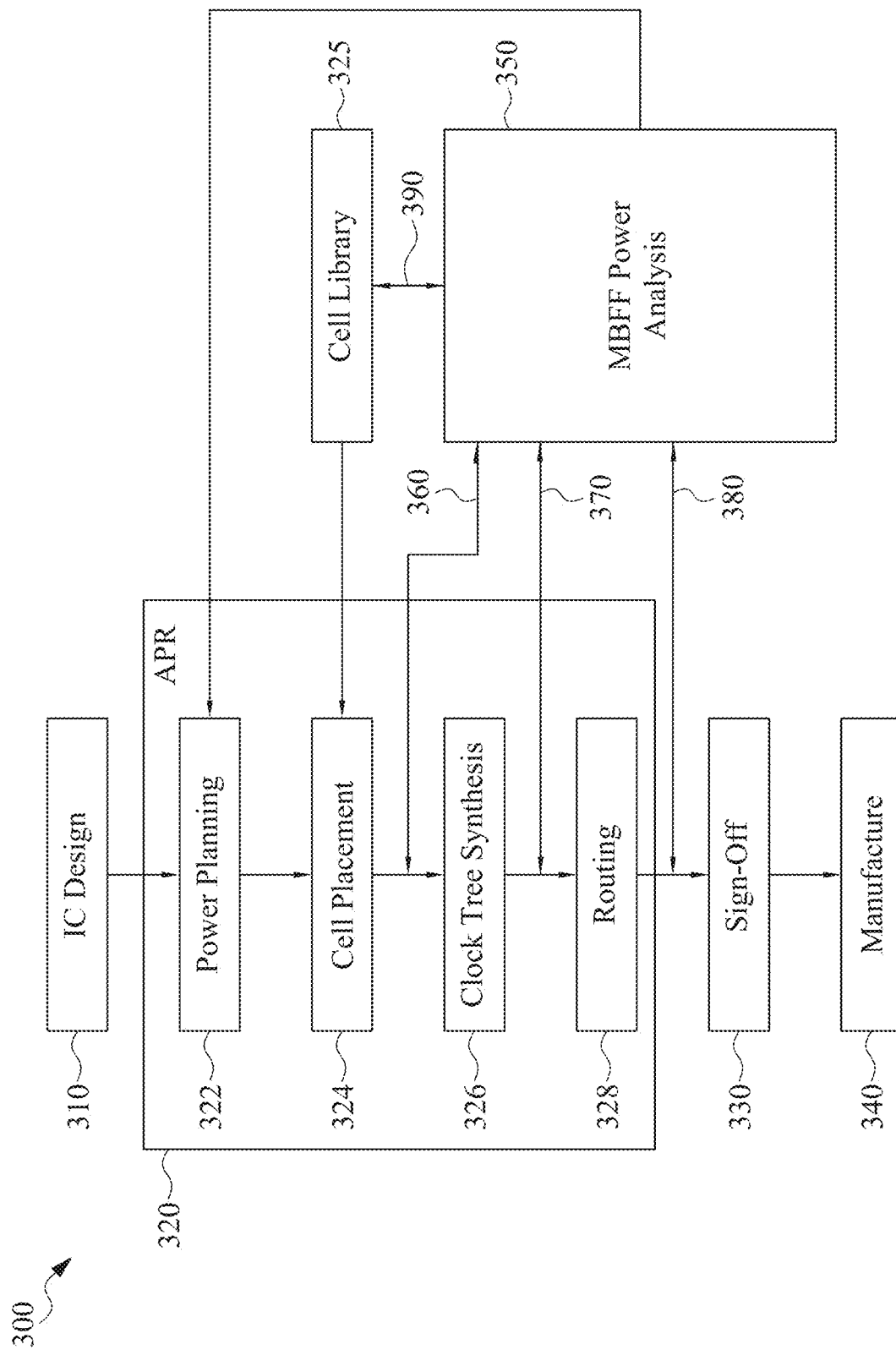
FIG. 3 is a functional flowchart of at least a portion of an IC design and manufacturing flow, in accordance with some embodiments.

FIG. 3 is a functional flow chart of at least a portion of an IC design and manufacturing flow 300, in accordance with some embodiments. The design and manufacturing flow 300 utilizes one or more electronic design automation (EDA) tools for generating, optimizing and/or verifying a design of an IC before manufacturing the IC. The EDA tools, in some embodiments, are one or more sets of executable instructions for execution by a processor or controller or a programmed computer to perform the indicated functionality. In at least one embodiment, the IC design and manufacturing flow 300 is performed by a design house of an IC manufacturing system discussed herein with respect to FIG. 3.

At IC design operation 310, a design of an IC is provided by a circuit designer. In some embodiments, the design of the IC comprises an IC schematic, i.e., an electrical diagram, of the IC. In some embodiments, the schematic is generated or provided in the form of a schematic netlist, such as a Simulation Program with Integrated Circuit Emphasis (SPICE) netlist. Other data formats for describing the design are usable in some embodiments. In some embodiments, a pre-layout simulation is performed on the design to determine whether the design meets a predetermined specification. When the design does not meet the predetermined specification, the IC is redesigned. In at least one embodiment, a pre-layout simulation is omitted from FIG. 3. In at least one embodiment, method 300 further includes a pre-layout simulation performed after operation 310.

At Automatic Placement and Routing (APR) operation 320, a layout diagram of the IC is generated based on the IC schematic. The IC layout diagram comprises the physical positions of various circuit elements of the IC as well as the physical positions of various nets interconnecting the circuit elements. For example, the IC layout diagram is generated in the form of a Graphic Design System (GDS) or GDSII file. Other data formats for describing the design of the IC are within the scope of various embodiments. In the example configuration in FIG. 3, the IC layout diagram is generated by an EDA tool, such as an APR tool. The APR tool receives the design of the IC in the form of a netlist as described herein. The APR tool performs floor planning to identify circuit elements, which are to be electrically connected to each other and which are to be placed in close proximity to each other, for reducing the area of the IC and/or reducing time delays of signals travelling over the interconnections or nets connecting the electrically connected circuit elements. In some embodiments, the APR tool performs partitioning to divide the design of the IC into a plurality of blocks or groups, such as clock and logic groups. In the example configuration in FIG. 3, the APR tool performs one or more of a power planning operation 322, a cell placement operation 324, a clock tree synthesis (CTS) operation 326 or a routing operation 328.

At power planning operation 322, the APR tool performs power planning, based on the partitioning and/or the floor planning of the IC design, to generate a power grid structure which includes several conductive layers, such as metal layers. In some embodiments, one metal layer of the metal layers includes power lines or power rails extending in one direction, e.g., horizontally in a plan view. In some embodiments, another metal layer of the metal layers includes power lines or power rails extending in an orthogonal direction, e.g., vertically in a plan view.

At cell placement operation 324, the APR tool performs cell placement. For example, standard cells (also referred to herein as "cells") configured to provide pre-defined functions and having pre-designed layout diagrams are stored in one or more cell libraries 325. The APR tool accesses various cells from one or more cell libraries 325, and places the cells in an abutting manner to generate an IC layout diagram corresponding to the IC schematic.

The generated IC layout diagram includes the power grid structure and a plurality of cells, each cell including one or more circuit elements and/or one or more nets. In some embodiments, each cell includes one or more flip-flops or one or more multi-bit flip-flops, similar to the multi-bit flip-flop 100 of FIG. 1, the multi-bit flip-flops 200A of FIG. 2A and the multi-bit flip-flop 200B of FIG. 2B. In some embodiments, a cell includes a logic gate cell. In some embodiments, a logic gate cell includes an AND, OR, NAND, NOR, XOR, INV, AND-OR-Invert (AOI), OR-AND-Invert (OAI), MUX, Flip-flop, BUFF, Latch, delay, clock cells, or the like. In some embodiments, a cell includes a memory cell. In some embodiments, a memory cell includes a static random access memory (SRAM), a dynamic RAM (DRAM), a resistive RAM (RRAM), a magnetoresistive RAM (MRAM), a read only memory (ROM), or the like. In some embodiments, a circuit element is an active element or a passive element. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), or the like, FinFETs, planar MOS transistors with raised source/drains, or the like. Examples of passive elements include, but are not limited to, capacitors, inductors, fuses, and resistors. Examples of nets include, but are not limited to, vias, conductive pads, conductive traces, and conductive redistribution layers, or the like.

At clock tree synthesis (CTS) operation 326, the APR tool performs CTS to minimize skew and/or delays potentially present due to the placement of circuit elements in the IC layout diagram. The CTS includes an optimization process to ensure that signals are transmitted and/or arrived at appropriate timings. For example, during the optimization process within the CTS, one or more buffers are inserted into the IC layout diagram to add and/or remove slack (timing for signal arrival) to achieve a desired timing. In some embodiments, operation 326 includes performing a timing analysis (similar to operation 404 of method 400 (shown in FIG. 4)) of one or more critical paths that include one or more multi-bit flip-flops to determine timing violations in the one or more critical paths. The described CTS of operation 326 is an example. Other arrangements or operations are within the scope of various embodiments. For example, in one or more embodiments, one or more of the described operations are repeated or omitted.

At routing operation 328, the APR tool performs routing to route various nets interconnecting the placed circuit elements. The routing is performed to ensure that the routed interconnections or nets satisfy a set of constraints. For example, routing operation 328 includes global routing, track assignment and detailed routing. During the global routing, routing resources used for interconnections or nets are allocated. For example, the routing area is divided into a number of sub-areas, pins of the placed circuit elements are mapped to the sub-areas, and nets are constructed as sets of sub-areas in which interconnections are physically routable. During the track assignment, the APR tool assigns interconnections or nets to corresponding conductive layers of the IC layout diagram. During the detailed routing, the APR tool routes interconnections or nets in the assigned conductive layers and within the global routing resources. For example, detailed, physical interconnections are generated within the corresponding sets of sub-areas defined at the global routing and in the conductive layers defined at the track assignment. After routing operation 328, the APR tool outputs the IC layout diagram including the power grid structure, placed circuit elements and routed nets. The described APR tool is an example. Other arrangements are within the scope of various embodiments. For example, in one or more embodiments, one or more of the described operations are omitted.

At sign-off operation 330, one or more physical and/or timing verifications are performed. For example, sign-off operation 330 includes one or more of a resistance and capacitance (RC) extraction, a layout-versus-schematic (LVS) check, a design rule check (DRC) or a timing sign-off check (also referred to as a post-layout simulation). In some embodiments, other verification processes are performed.

In some embodiments, an RC extraction is performed, e.g., by an EDA tool, to determine parasitic parameters, e.g., parasitic resistance and parasitic capacitance, of components in the IC layout diagram for timing simulations in a subsequent operation.

In some embodiments, an LVS check is performed to ensure that the generated IC layout diagram corresponds to the design of the IC. Specifically, an LVS checking tool, i.e., an EDA tool, recognizes electrical components as well as connections in the space between the patterns of the generated IC layout diagram. The LVS checking tool then generates a layout netlist representing the recognized electrical components and connections. The layout netlist generated from the IC layout diagram is compared, by the LVS checking tool, with the schematic netlist of the design of the IC. If the two netlists match within a matching tolerance, the LVS check is passed. Otherwise, correction is made to at least one of the IC layout diagram or the design of the IC by returning the process to IC design operation 310 and/or APR operation 320.

In some embodiments, a DRC is performed, e.g., by an EDA tool, to ensure that the IC layout diagram satisfies certain manufacturing design rules, i.e., to ensure manufacturability of the IC. If one or more design rules is/are violated, correction is made to at least one of the IC layout diagram or the design of the IC by returning the process to IC design operation 310 and/or APR operation 320. Examples of design rules include, but are not limited to, a width rule which specifies a minimum width of a pattern in the IC layout diagram, a spacing rule which specifies a minimum spacing between adjacent patterns in the IC layout diagram, an area rule which specifies a minimum area of a pattern in the IC layout diagram, or the like.

In some embodiments, a timing sign-off check (post-layout simulation) is performed, e.g., by an EDA tool, to determine, taking the extracted parasitic parameters into account, whether the IC layout diagram meets a predetermined specification of one or more timing requirements. If the simulation indicates that the IC layout diagram does not meet the predetermined specification, e.g., if the parasitic parameters cause undesirable delays, correction is made to at least one of the IC layout diagram or the design of the IC by returning the process to IC design operation 310 and/or APR operation 320. Otherwise, the IC layout diagram is passed to manufacture or additional verification processes.

Figure 8:
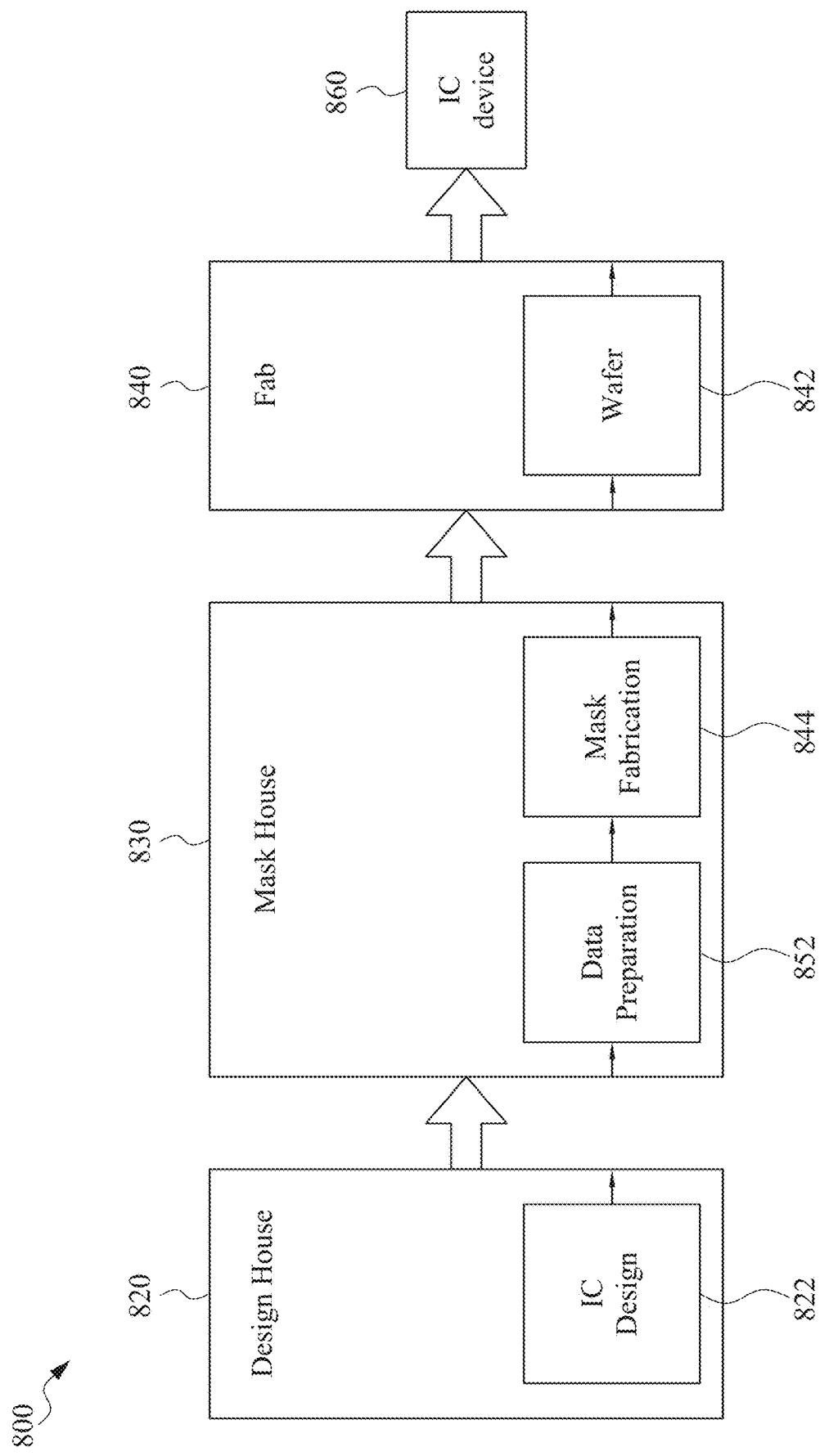
FIG. 8 is a block diagram of an integrated circuit (IC) manufacturing system, and an IC manufacturing flow associated therewith, in accordance with at least one embodiment of the present disclosure.

In operation 340, the integrated circuit is manufactured based on the layout diagram. In some embodiments, the layout diagram of method 300 includes layout diagram 600B or layout diagram 600D which are usable to manufacture the integrated circuit, such as one or more of MBFF 100, circuit 200A of FIG. 2A or circuit 200B of FIG. 2B. In some embodiments, the integrated circuit manufactured by operation 340 includes at least MBFF 100, circuit 200A of FIG. 2A or circuit 200B of FIG. 2B. In some embodiments, operation 340 of method 300 comprises manufacturing at least one mask based on the layout diagram, and manufacturing the integrated circuit based on the at least one mask. In some embodiments, operation 340 is performed by IC manufacturing system 800 (FIG. 8). In some embodiments, one or more of the above-described operations are omitted.

Figure 4:
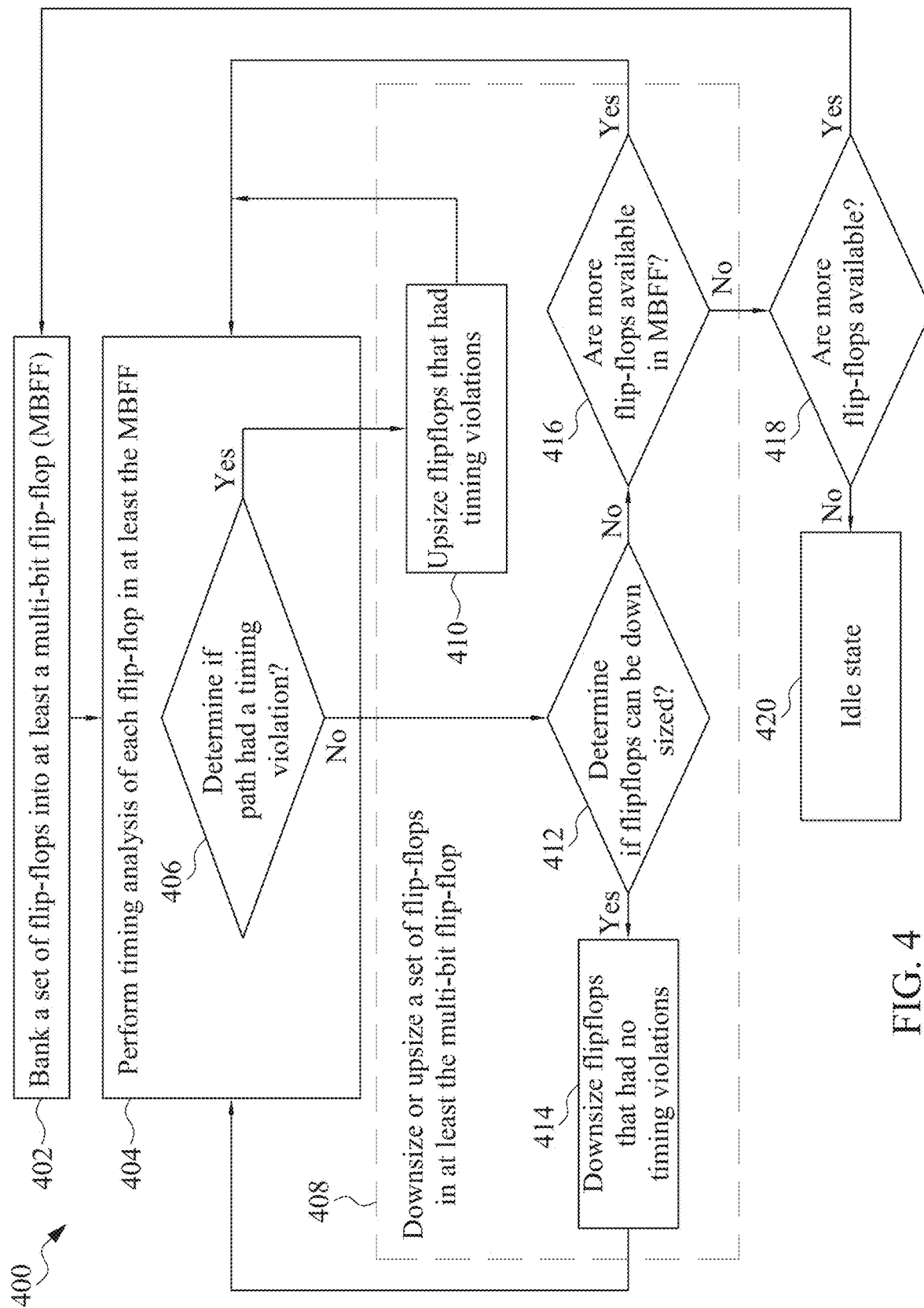
FIG. 4 is a flowchart of a method, in accordance with some embodiments.

An additional verification process involves a multi-bit flip-flop (MBFF) power analysis 350. In some embodiments, the MBFF power analysis 350 is performed by the APR tool or by another EDA tool. In some embodiments, the MBFF power analysis 350 is performed to determine the power consumed by at least one flip-flop in the multi-bit flip-flop, such as MBFF 100, or at least one flip-flop in an integrated circuit, e.g., circuit 200A-200B of FIGS. 2A-2B. In some embodiments, the MBFF power analysis 350 is also configured to perform a timing analysis of at least one flip-flop in the multi-bit flip-flop, such as MBFF 100, or at least one flip-flop in an integrated circuit, e.g., circuit 200A-200B of FIGS. 2A-2B. In some embodiments, the MBFF power analysis 350 is configured to optimize the power consumed by one or more flip-flops, such as MBFF 100 or circuit 200A or 200B of FIG. 2A or 2B, while also passing a timing analysis of the flip-flops in the integrated circuit. In some embodiments, portions of method 400 of FIG. 4 are an embodiment of at least the MBFF power analysis 350.

In some embodiments, MBFF power analysis 350 is part of a banking engine or a de-banking engine. In some embodiments, a banking engine is a portion of APR 320 that is configured to bank or group a plurality of flip-flops into one or more multibit flip-flops (MBFFs), as implemented by operation 402 of method 400 or shown by FIGS. 5A-5B. In some embodiments, a de-banking engine is a portion of APR 320 that is configured to de-bank or de-group one or more flip-flops in the one or more MBFFs into one or more flip-flops not part of the one or more MBFFs. In some embodiments, the banking or de-banking engine are part of other portions of IC design and manufacturing flow 300. For example, in some embodiments, the banking or de-banking engine are part of IC design operation 310. In some embodiments, the banking engine or de-banking engine are aware of the analysis performed by MBFF power analysis 350.

In some embodiments, MBFF power analysis 350 is performed at the cell or block level. For example, MBFF power analysis 350 is performed for a region of the IC, instead of the whole IC. In at least one embodiment, a region of the IC includes a standard cell. In at least one embodiment, a region includes a group or a block of standard cells of the same or similar type or function, e.g., a block or group of MBFF cells, or a block or group of flip-flop cells, or the like. In at least one embodiment, a region includes a group or block of standard cells of different types or functions coupled together provide a function or module for the IC, e.g., a communication interface.

Other arrangements for dividing the IC into multiple regions for the MBFF power analysis 350 are within the scopes of various embodiments. For simplicity, in the detailed description of one or more embodiments herein, a standard cell or cell is used as an example of a region of an IC.

In some embodiments, MBFF power analysis 350 is performed at an early design stage. In at least one embodiment, MBFF power analysis 350 is performed between cell placement operation 324 and clock tree synthesis operation 326, as indicated by arrow 360 in FIG. 3. In at least one embodiment, MBFF power analysis 350 is performed between clock tree synthesis operation 326 and routing operation 328, as indicated by arrow 370 in FIG. 3. In at least one embodiment, MBFF power analysis 350 is performed between routing operation 328 and sign-off operation 330, as indicated at arrow 380 by FIG. 3. In at least one embodiment, MBFF power analysis 350 is performed multiple times in IC design flow 300, for example, at two or more stages indicated by arrows 360, 370, 380. In at least one embodiment, sign-off operation 330 still includes an MBFF power analysis 350 at the system level despite the fact that MBFF power analysis 350 has been performed earlier after one or more of cell placement 324, clock tree synthesis operation 326 or routing operation 328. In at least one embodiment, MBFF power analysis 350 is performed to determine power optimization of at least one standard cell stored in one or more cell libraries 325, as indicated by arrow 390 in FIG. 3. In some embodiments, cell library 325 includes an MBFF library 720 (shown in FIG. 7) that includes a number of MBFF standard cells.

As described herein, in some embodiments, MBFF power analysis 350 is performed to optimize the power consumed by one or more flip-flops, such as MBFF 100 or circuit 200A or 200B of FIG. 2A or 2B, while also passing a timing analysis of the flip-flops in the integrated circuit. In some embodiments, an example of MBFF power analysis 350 is shown as method 400 of FIG. 4. In some embodiments, MBFF power analysis 350 includes replacing a group of flip-flops with a banked MBFF having a plurality of flip-flops having different current driving abilities.

In some embodiments, by having different driving current capabilities, the corresponding flip-flops are able to switch states fast enough in order to pass timing tests or timing violations, but also do not consume additional power by being overdesigned by having a driving current capability more than needed in order to pass the timing tests or timing violations. Thus, one or more embodiments of the present disclosure are configured to optimize power and pass timing violations during the same operation, resulting in MBFFs that consume less power and occupy less area than other approaches. Furthermore, in some embodiments, one or more embodiments of the present disclosure are configured to optimize power and pass timing violations during the same operation resulting in a design and manufacturing flow 300 that includes less steps than other approaches that always de-bank flip-flops that are part of an MBFF that does not pass one or more timing violations.

FIG. 4 is a flow chart of a method 400, in accordance with some embodiments.

Figure 7:
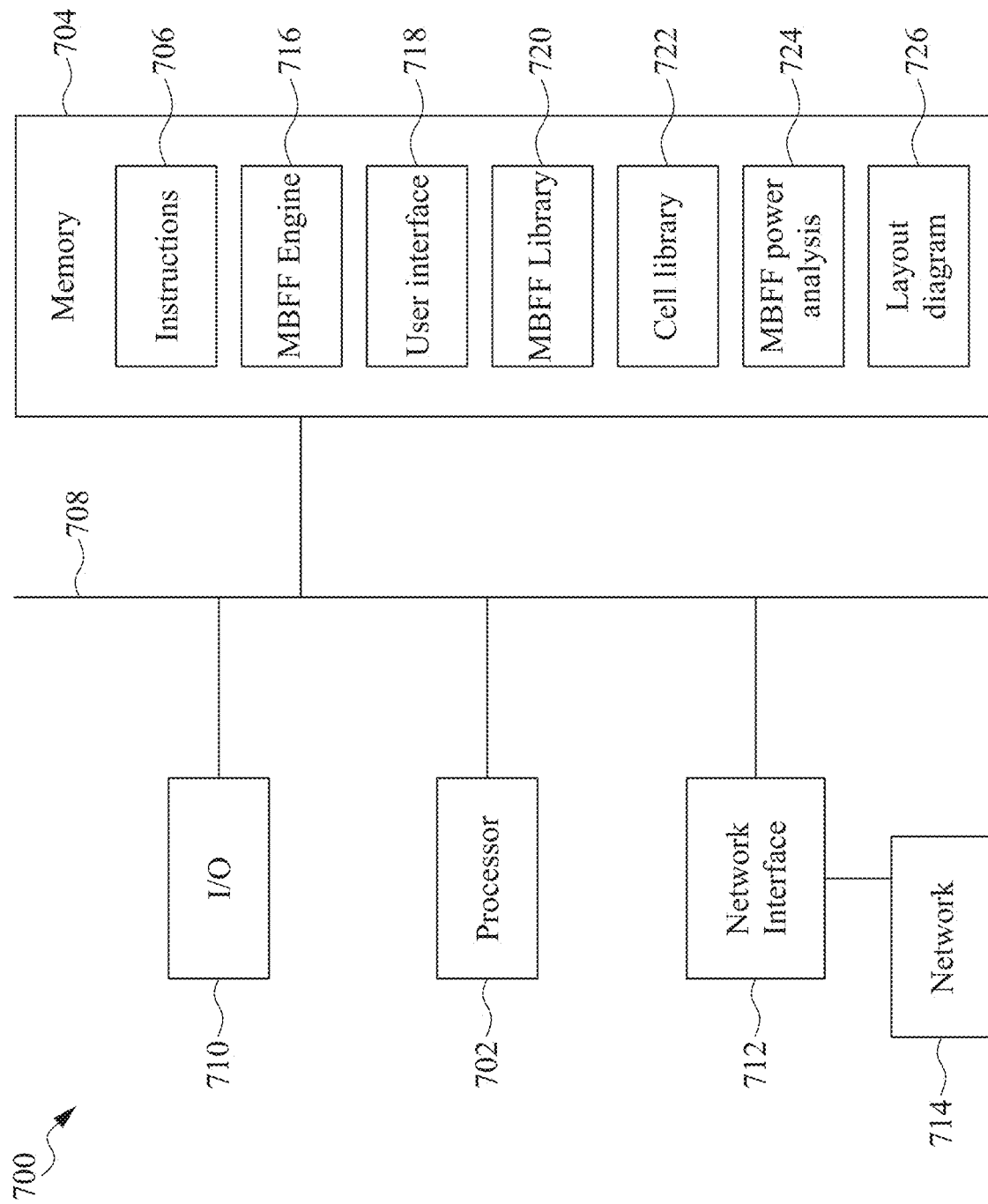
FIG. 7 is a schematic view of a system for designing an IC layout design, in accordance with some embodiments.

In at least one embodiment, method 400 corresponds to MBFF power analysis 350, and is performed in whole or in part by a processor, such as processor 702 of FIG. 7.

It is understood that additional operations may be performed before, during, and/or after the method 400 depicted in FIG. 4, and that some other processes may only be briefly described herein. It is understood that method 400 utilizes features of one or more of MBFF 100 of FIG. 1, or circuits 200A-200B of corresponding FIGS. 2A-2B. While the details of method 400 are described with respect to circuit elements, such as flip-flops or MBFFs, it is understood that the details of method 400 is applicable to circuit elements within a corresponding layout diagram, such as layout diagram 500A-500B of FIGS. 5A-5B or layout diagrams 600A-600D of corresponding FIGS. 6A-6D. For example, it is understood that method 400 utilizes features of one or more of layout diagrams 500A-500B of corresponding FIGS. 5A-5B, or layout diagrams 600A-600D of corresponding FIGS. 6A-6D.

In operation 402 of method 400, a set of flip-flops 501A (FIG. 5A) are banked or grouped into at least one MBFF (e.g., MBFF 501B of FIG. 5B) having a same driving current capability. In some embodiments, whether a set of flip-flops are banked or grouped into at least one MBFF 100 depends upon a number of criteria. In some embodiments, the criteria includes the proximity or distance between the flip-flops, whether the flip-flops share a same clock signal CLK, a same set signal S1, a same reset signal R1, a same scan enable signal SE1 or the like, or share a same corresponding pin. In other words, in these embodiments, flip-flops that are located from each other by a distance that will result in delays in at least the clock signal CLK, the set signal S1, the reset signal R1, or the scan enable signal SE1 will likely cause timing violations (described below in operation 406) which will prevent the set of flip-flops from being banked or grouped into at least one MBFF 501B. In some embodiments, operation 402 of method will attempt to bank or group as many flip-flops as possible into the at least one MBFF provided no timing violations occur. In other words, in some embodiments, the timing violations are at least one upper limit on the number of flip-flops that can be banked or grouped together. In some embodiments, the at least one MBFF of method 400 includes two or more flip-flops or corresponding bits. Other numbers of bits or corresponding flip-flops in MBFF are within the scope of the present disclosure.

Figures 5A, 5B:
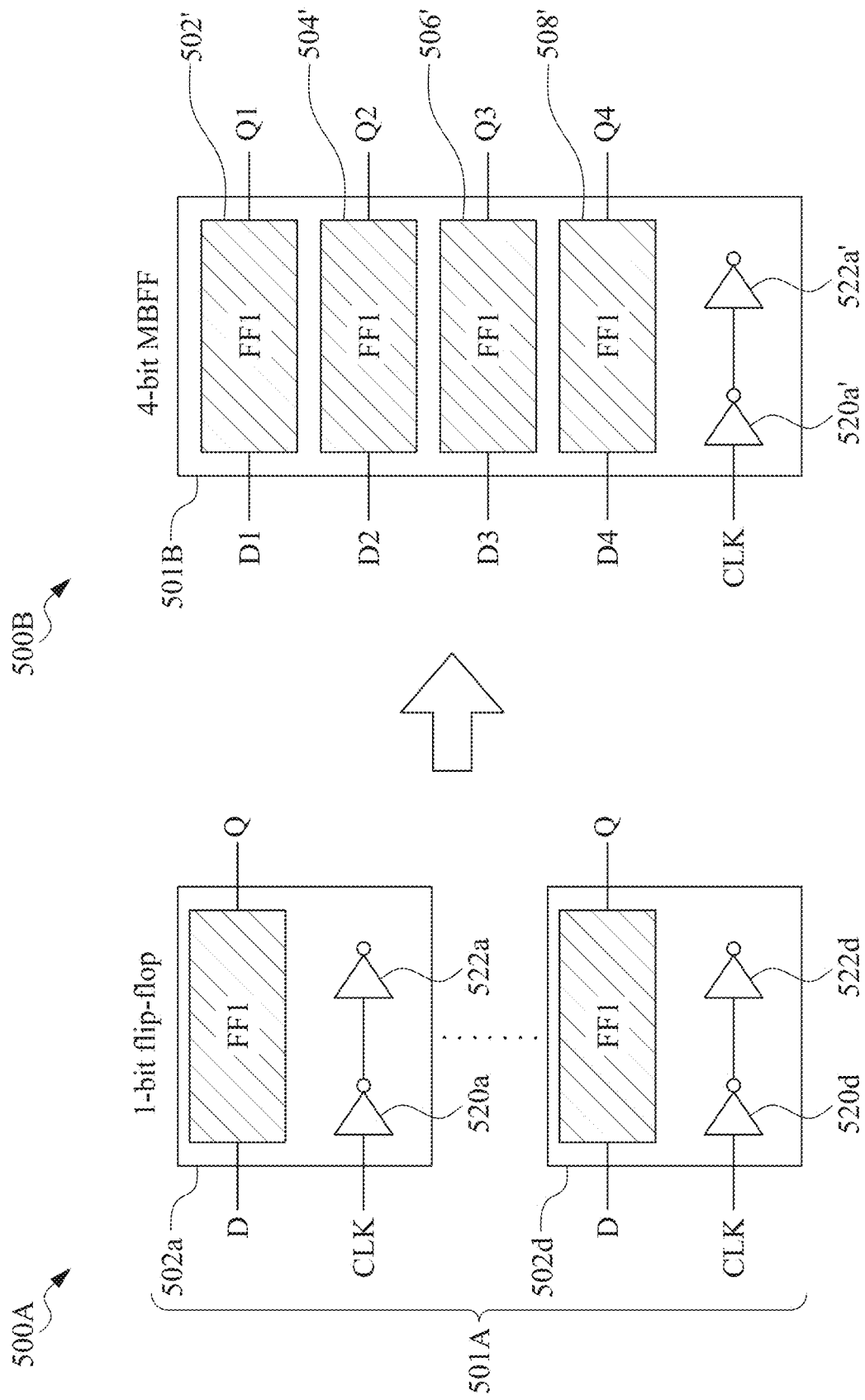
FIGS. 5A-5B are schematic views of layout diagrams of flip-flops before and after modifications, in accordance with some embodiments.

In some embodiments, the set of flip-flops 501A includes flip-flops 502a, 502b, 502c and 502d (FIG. 5A). Other numbers of flip-flops of the set of flip-flops 501A are within the scope of the present disclosure. In some embodiments, the MBFF 501B includes flip-flops 502', 504', 506' and 508' (FIG. 5B). Other numbers of flip-flops in MBFF 501B are within the scope of the present disclosure.

In some embodiments, each of the flip-flops in the set of flip-flops 501A or MBFF 501B has the first driving current capability FF1. Other driving current capability for the set of flip-flops 501A or MBFF 501B is within the scope of the present disclosure. For example, in some embodiments, each of flip-flops in the set of flip-flops 501A or MBFF 501B has the second driving current capability FF0.

In operation 404 of method 400, a timing analysis of each flip-flop 502', 504', 506', 508' in at least multi-bit flip-flop 501B is performed. In some embodiments, operation 404 includes operation 406. In some embodiments, the timing analysis of operation 404 includes determining if a timing event occurs outside of a clock period of a clock signal CLK. For example, in some embodiments, a timing violation occurs if one or more of flip-flops 502', 504', 506' and 508' do not transition from a first state to a second state within a clock period of clock signal CLK.

In operation 406 of method 400, a determination is made if a timing violation occurs for each flip-flop 502', 504', 506', 508' in at least multi-bit flip-flop 501B. In some embodiments, a timing violation occurs for a negative slack on a path having a flip-flop. In some embodiments, slack is a difference between an actual time and a desired time for a timing path having a flip-flop of MBFF 501B. Thus, a negative slack occurs when the actual time is greater than the desired time for the corresponding timing path. Similarly, a positive slack occurs when the actual time is less than the desired time for the corresponding timing path. In some embodiments, if a positive slack is determined in operation 406, then no timing violation occurs for the corresponding flip-flop in the corresponding timing path, the result of operation 406 is a "no", and method 400 proceeds to operation 412. In some embodiments, if a negative slack is determined in operation 406, then a timing violation occurs for the corresponding flip-flop in the corresponding timing path, the result of operation 406 is a "yes", and method 400 proceeds to operation 410. In some embodiments, at least operation 404 or 406 is performed by a static timing analysis EDA tool.

Figures 6C, 6D:
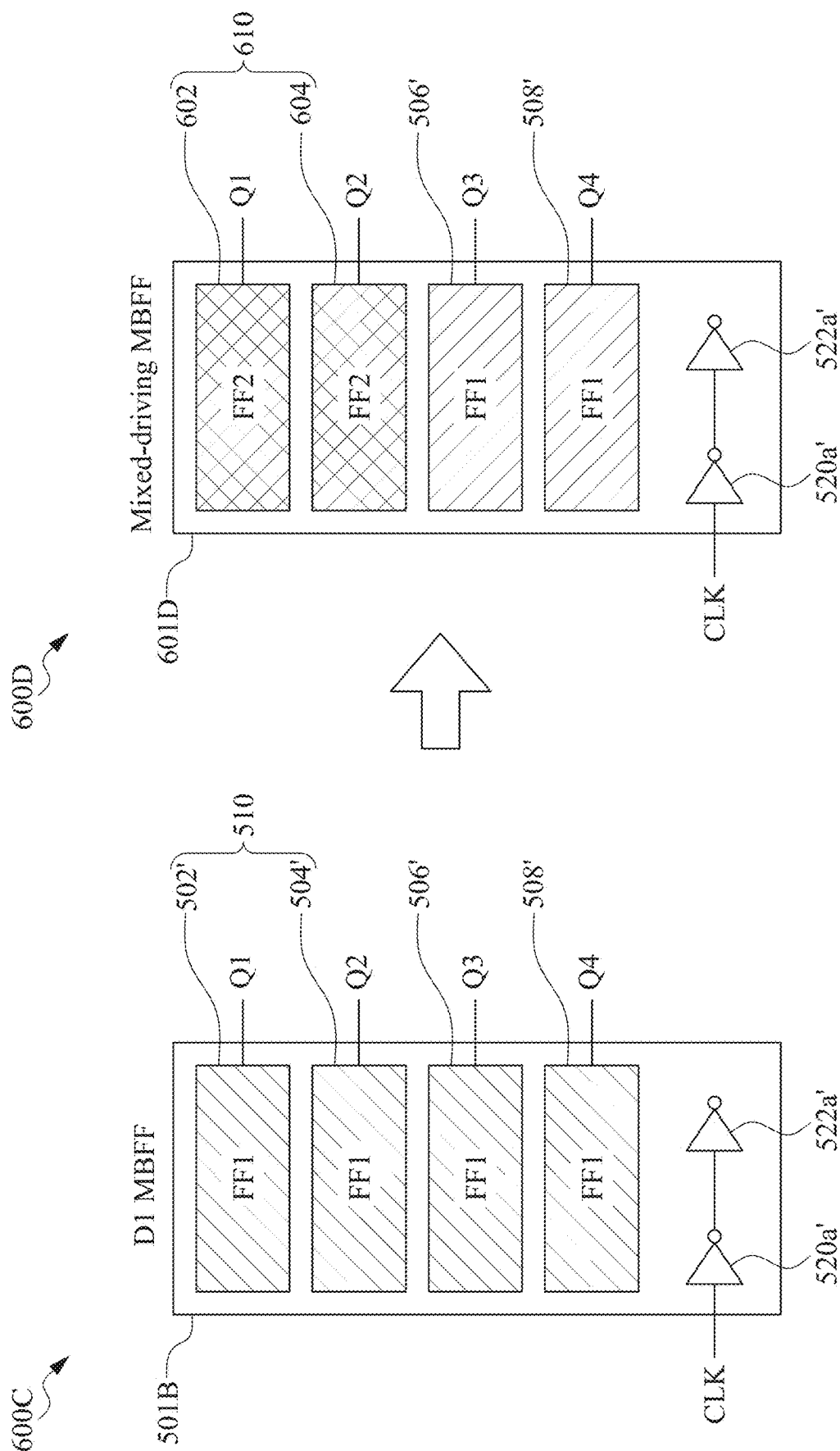

In operation 408 of method 400, a set of flip-flops in at least the multi-bit flip-flop 501B are downsized or upsized. For example, as shown in FIG. 6B, set of flip-flops 612 of MBFF 601B are downsized. For example, as shown in FIG. 6D, set of flip-flops 610 of MBFF 601D are upsized. In some embodiments, operation 408 includes at least operation 410, operation 412, operation 414 or operation 416.

In operation 410 of method 400, a set of flip-flops 610 in at least the multi-bit flip-flop 501B are upsized (e.g., shown in MBFF 601D). In some embodiments, if a timing violation occurs in a path, for example the determination of operation 406 is "yes", then method 400 will upsize the flip-flops that had a timing violation in attempting to remove the timing violation. In some embodiments, upsizing the flip-flops that had a timing violation includes increasing the driving current capability of the corresponding flip-flops thereby increasing the switching speed of the corresponding flip-flops. For example, as shown in FIG. 6D, set of flip-flops 610 of MBFF 601D are upsized and have a third driving current capability FF2, while the driving current capability of set of flip-flops 506' and 508' are maintained at their previous driving current capability (e.g., FF1).

After operation 410, method 400 returns to operation 404 to perform additional timing analysis. In some embodiments, the additional timing analysis performed in operation 404 is to determine if the upsized flip-flops still have timing violations or new timing violations.

In operation 412 of method 400, a determination is made if flip-flops can be downsized. In some embodiments, if the determination of operation 412 is "yes", then method 400 proceeds to operation 414 where a set of flip-flops 512 will be downsized. In some embodiments, if the determination of operation 412 is "no", then method 400 proceeds to operation 416. In some embodiments, if a previous set of flip-flops were upsized in operation 410, and then operation 406 determined that the upsized flip-flops path had no timing violation, then the result of operation 412 for the upsized flip-flops is "no," since the upsized flip-flops path should not be downsized as it was just previously upsized and did not include a timing violation.

In operation 414 of method 400, a set of flip-flops 512 in at least the multi-bit flip-flop 501B are downsized (e.g., shown as the set of flip-flops 612 in MBFF 601B of FIG. 6B). In some embodiments, if no timing violation occurs in a path, for example the determination of operation 406 is "no", then operation 414 of method 400 will downsize the flip-flops that did not have a timing violation in attempting to save power. In some embodiments, downsizing the flip-flops that did not have a timing violation includes decreasing the driving current capability of the corresponding flip-flops thereby decreasing the switching speed of the corresponding flip-flops thereby reducing the dynamic power consumed by the corresponding flip-flops. For example, as shown in FIG. 6B, set of flip-flops 612 of MBFF 601B are downsized and have the second driving current capability FF0, while the driving current capability of set of flip-flops 502' and 504' are maintained at their previous driving current capability (e.g., FF1).

After operation 414, method 400 returns to operation 404 to perform additional timing analysis. In some embodiments, the additional timing analysis performed in operation 404 is to determine if the downsized flip-flops have timing violations. In some embodiments, if the downsized flip-flops now have timing violations, then the downsized flip-flops are returned to their previous size (e.g., with their previous driving current capability).

In operation 416 of method 400, a determination is made if more or additional flip-flops are available in the at least one MBFF (e.g., MBFF 501B of FIG. 5B) or the banked set of flip-flops. In some embodiments, if the determination of operation 416 is "yes", then method 400 returns to operation 404 where additional timing analysis is performed on the additional flip-flops that are banked in the set of flip-flops 512 or additional timing analysis is performed for other critical paths having a corresponding flip-flop in the at least one MBFF. In some embodiments, if the determination of operation 416 is "no", then method 400 proceeds to operation 418.

In operation 418 of method 400, a determination is made if more flip-flops are available in the layout diagram, such as layout diagram 500A, that were not part of the at least one MBFF. In some embodiments, operation 418 further includes a determination if additional flip-flops were added to the layout diagram, such as layout diagram 500A. In some embodiments, if the determination of operation 418 is "yes", then method 400 proceeds to operation 402 where method 400 will attempt to bank the additional flip-flops into the at least one MBFF or into other MBFFs. In some embodiments, if the determination of operation 418 is "no", then method 400 proceeds to operation 420.

In operation 420, method 400 is in an idle state. In some embodiments, the idle state corresponds to method 400 waiting for an update from one of the parameters of operations 402-420. In some embodiments, method 400 remains in the idle state until additional flip-flops are added to the layout diagram, such as layout diagram 500A. In some embodiments, if additional flip-flops are added to the layout diagram, such as layout diagram 500A, then operation 420 may return (not shown in FIG. 4) to operation 418. In some embodiments, the idle state of operation 420 may include the end of method 400.

In some embodiments, at least operation 402, 404, 406, 408, 410, 412, 414, 416, 418 or 420 is performed by an EDA tool, such as system 700 of FIG. 7.

In some embodiments, at least one method(s), such as method 300 or 400 discussed above, is performed in whole or in part by at least one EDA system, including system 700. In some embodiments, an EDA system is usable as part of a design house of an IC manufacturing system 800 of FIG. 8.

In some embodiments, one or more of the operations of method 400 is not performed. While method 400 was described above with reference to FIGS. 1, 2A-2B, it is understood that method 400 utilizes the features of one or more of FIGS. 5A-5B & 6A-6D. In some embodiments, other operations of method 400 would be performed consistent with the description and operation of layout diagrams 500A-500B & 600A-600D of corresponding FIGS. 5A-5B & 6A-6D.

Furthermore, in some embodiments, one or more embodiments of the present disclosure are configured to optimize power and pass timing violations during the same operation resulting in a method 400 that includes less steps than other approaches that always de-bank flip-flops that are part of an MBFF that does not pass one or more timing violations.

Examples of Method 400

FIGS. 5A-5B are schematic views of layout diagrams 500A-500B of flip-flops before and after modifications, in accordance with some embodiments. The modifications are made as part of method 400 described with respect to FIG. 4.

FIG. 5A is a schematic view of a layout diagram 500A of a set of flip-flops, e.g., set of flip-flops 501A, before execution of operation 402 of method 400 of FIG. 4.

The set of flip-flops 501A includes flip-flops 502a, 502b, 502c and 502d. Other numbers of flip-flops of the set of flip-flops 501A are within the scope of the present disclosure. Each of the flip-flops 502a, 502b, 502c and 502d has a corresponding inverter 520a, 520b, 520c and 520d, and a corresponding inverter 522a, 522b, 522c and 522d. In some embodiments, each of the flip-flops in the set of flip-flops 501A has the first driving current capability FF1. Other driving current capability for the set of flip-flops 501A is within the scope of the present disclosure. For example, in some embodiments, each of flip-flops in the set of flip-flops 501A has the second driving current capability FF0.

FIG. 5B is a schematic view of a layout diagram 500B of a multi-bit flip-flop, e.g., MBFF 501B, after execution of operation 402 of method 400 of FIG. 4.

MBFF 501B includes flip-flops 502', 504', 506' and 508' and inverters 520a' and 522a'. Other numbers of flip-flops in MBFF 501B are within the scope of the present disclosure. In some embodiments, each of the flip-flops in MBFF 501B has a same driving current capability or the first driving current capability FF1. Other driving current capability for MBFF 501B is within the scope of the present disclosure.

For example, in some embodiments, each of flip-flops in MBFF 501B has the second driving current capability FF0.

FIGS. 6A-6D are schematic views of layout diagrams 600A-600D of flip-flops before and after modifications, in accordance with some embodiments. The modifications are made as part of method 400 described with respect to FIG. 4.

FIG. 6A is a schematic view of a layout diagram 600A of a multi-bit flip-flop, e.g., MBFF 501B, before execution of operation 414 of method 400 of FIG. 4.

MBFF 501B includes flip-flops 502', 504', 506' and 508'. In some embodiments, each of the flip-flops in MBFF 501B has a same driving current capability or the first driving current capability FF1. Set of flip-flops 512 includes flip-flops 506' and 508'. Set of flip-flops 512 in multi-bit flip-flop 501B are to be downsized in operation 414 of method 400.

FIG. 6B is a schematic view of a layout diagram 600B of a multi-bit flip-flop, e.g., MBFF 601B, after execution of operation 414 of method 400 of FIG. 4.

MBFF 601B includes flip-flops 502', 504', 606 and 608. Set of flip-flops 612 includes flip-flops 606 and 608. Set of flip-flops 612 were downsized in operation 414 of method 400. In some embodiments, flip-flops 502' and 504' have a same driving current capability or the first driving current capability FF1. In some embodiments, flip-flops 606 and 608 have a same driving current capability or the second driving current capability FF0.

FIG. 6C is a schematic view of a layout diagram 600C of a multi-bit flip-flop, e.g., MBFF 501B, before execution of operation 410 of method 400 of FIG. 4.

MBFF 501B includes flip-flops 502', 504', 506' and 508' and inverters 520a' and 522a'. In some embodiments, each of the flip-flops in MBFF 501B has a same driving current capability or the first driving current capability FF1. Set of flip-flops 510 includes flip-flops 502' and 504'. Set of flip-flops 510 in multi-bit flip-flop 501B are to be upsized in operation 410 of method 400.

FIG. 6D is a schematic view of a layout diagram 600D of a multi-bit flip-flop, e.g., MBFF 601D, after execution of operation 410 of method 400 of FIG. 4.

MBFF 601D includes flip-flops 602, 604, 506' and 508'. Set of flip-flops 612 includes flip-flops 606 and 608. Set of flip-flops 610 were upsized in operation 410 of method 400. In some embodiments, the set of flip-flops 610 had timing violations in operation 406, and therefore were upsized in order to overcome the timing violations of operation 406, and also optimized the total clock dynamic power consumption of MBFF 601D.

In some embodiments, flip-flops 602 and 604 have a same driving current capability or the third driving current capability FF2. In some embodiments, the third driving current capability FF2 is greater than the first driving current capability FF1 and the second driving current capability FF0.

In some embodiments, by having different driving current capabilities, the corresponding flip-flops of MBFF 601B or 601D are able to switch states fast enough in order to pass timing tests or timing violations, but also do not consume additional power by being overdesigned by having a driving current capability more than needed in order to pass the timing tests or timing violations. Thus, one or more embodiments of the present disclosure are configured to optimize power and pass timing violations during the same operation, resulting in MBFF 601B or 601D consuming less power and occupying less area than other approaches.

FIG. 7 is a schematic view of a system 700 for designing an IC layout design, in accordance with some embodiments.

In some embodiments, system 700 is at least a part of an EDA system. In some embodiments, system 700 includes an automated placement and routing (APR) system. In some embodiments, system 700 generates or places one or more IC layout designs described herein. In some embodiments, the IC layout designs of FIG. 7 includes at least layout diagrams 500A-500B of corresponding FIGS. 5A-5B and layout diagrams 600A-600D of corresponding FIGS. 6A-6D.

System 700 includes a hardware processor 702 and a non-transitory, computer readable storage medium 704 (shown in FIG. 7 as "Memory 704") encoded with, i.e., storing, the computer program code 706, i.e., a set of executable instructions. Computer readable storage medium 704 is configured for interfacing with manufacturing machines for producing the integrated circuit. The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in method 300 or 400.

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform method 300 or 400. In some embodiments, the storage medium 704 also stores information needed for performing method 300 or 400 as well as information generated during performing method 300 or 400, such as MBFF engine 716, user interface 718, MBFF library 720, cell library 722, MBFF power analysis 724 and layout diagram 726, and/or a set of executable instructions to perform the operation of method 300 or 400. In some embodiments, layout diagram 726 comprises one or more of layout diagrams 500A-500B of corresponding FIGS. 5A-5B and layout diagrams 600A-600D of corresponding FIGS. 6A-6D.

In some embodiments, the storage medium 704 stores instructions (e.g., computer program code 706) for interfacing with manufacturing machines. The instructions (e.g., computer program code 706) enable processor 702 to generate manufacturing instructions readable by the manufacturing machines to effectively implement method 300 or 400 during a manufacturing process.

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, method 300 or 400 is implemented in two or more systems 700, and information such as MBFF engine, user interface, MBFF library, cell library, MBFF power analysis and layout diagram are exchanged between different systems 700 by network 714.

System 700 is configured to receive information related to a layout diagram through I/O interface 710 or network interface 712. The information is transferred to processor 702 by bus 708 to determine a layout diagram for producing MBFF 100, circuit 200A or 200B. The layout diagram is then stored in computer readable medium 704 as layout design 726. System 700 is configured to receive information related to an MBFF engine through I/O interface 710 or network interface 712. The information is stored in computer readable medium 704 as MBFF engine 716. System 700 is configured to receive information related to a user interface through I/O interface 710 or network interface 712. The information is stored in computer readable medium 704 as user interface 718. System 700 is configured to receive information related to a MBFF library through I/O interface 710 or network interface 712. The information is stored in computer readable medium 704 as MBFF library 720. System 700 is configured to receive information related to a cell library through I/O interface 710 or network interface 712. The information is stored in computer readable medium 704 as cell library 722. System 700 is configured to receive information related to a MBFF power analysis library through I/O interface 710 or network interface 712. The information is stored in computer readable medium 704 as MBFF power analysis 724.

In some embodiments, method 300 or 400 is implemented as a standalone software application for execution by a processor. In some embodiments, method 300 or 400 is implemented as a software application that is a part of an additional software application. In some embodiments, method 300 or 400 is implemented as a plug-in to a software application. In some embodiments, method 300 or 400 is implemented as a software application that is a portion of an EDA tool. In some embodiments, method 300 or 400 is implemented as a software application that is used by an EDA tool. In some embodiments, the EDA tool is used to generate a layout diagram of the integrated circuit device. In some embodiments, the layout is stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design. In some embodiments, method 300 or 400 is implemented by a manufacturing device to manufacture an integrated circuit using a set of masks manufactured based on one or more layout designs generated by system 700. In some embodiments, system 700 a manufacturing device to manufacture an integrated circuit using a set of masks manufactured based on one or more layout designs of the present disclosure. In some embodiments, system 700 of FIG. 7 generates layout designs of an integrated circuit that are smaller than other approaches. In some embodiments, system 700 of FIG. 7 generates layout designs of integrated circuit structure that occupy less area and provide better routing resources than other approaches.

FIG. 8 is a block diagram of an integrated circuit (IC) manufacturing system 800, and an IC manufacturing flow associated therewith, in accordance with at least one embodiment of the present disclosure.

In FIG. 8, IC manufacturing system 800 includes entities, such as a design house 820, a mask house 830, and an IC manufacturer/fabricator ("fab") 840, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 840 is owned by a single larger company. In some embodiments, two or more of design house 820, mask house 830, and IC fab 840 coexist in a common facility and use common resources.

Design house (or design team) 820 generates an IC design layout 822. IC design layout 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout 822 includes various IC features, such as an active region, gate electrode, source electrode and drain electrode, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout 822. The design procedure includes one or more of logic design, physical design or place and route. IC design layout 822 is presented in one or more data files having information of the geometrical patterns. For example, IC design layout 822 can be expressed in a GDSII file format or DFII file format.

Mask house 830 includes data preparation 852 and mask fabrication 844. Mask house 830 uses IC design layout 822 to manufacture one or more masks to be used for fabricating the various layers of IC device 860 according to IC design layout 822. Mask house 830 performs mask data preparation 852, where IC design layout 822 is translated into a representative data file ("RDF"). Mask data preparation 852 provides the RDF to mask fabrication 844. Mask fabrication 844 includes a mask writer. A mask writer converts the RDF to an image on a substrate, such as a mask (reticle) or a semiconductor wafer. The design layout is manipulated by mask data preparation 852 to comply with particular characteristics of the mask writer and/or requirements of IC fab 840. In FIG. 8, mask data preparation 852 and mask fabrication 844 are illustrated as separate elements. In some embodiments, mask data preparation 852 and mask fabrication 844 can be collectively referred to as mask data preparation.

In some embodiments, mask data preparation 852 includes optical proximity correction (OPC) which uses lithography enhancement techniques to compensate for image errors, such as those that can arise from diffraction, interference, other process effects and the like. OPC adjusts IC design layout 822. In some embodiments, mask data preparation 852 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 852 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 844, which may undo part of the modifications performed by OPC in order to meet mask creation rules.

In some embodiments, mask data preparation 852 includes lithography process checking (LPC) that simulates processing that will be implemented by IC fab 840 to fabricate IC device 860. LPC simulates this processing based on IC design layout 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 822.

It should be understood that the above description of mask data preparation 852 has been simplified for the purposes of clarity. In some embodiments, data preparation 852 includes additional features such as a logic operation (LOP) to modify the IC design layout according to manufacturing rules. Additionally, the processes applied to IC design layout 822 during data preparation 852 may be executed in a variety of different orders.

After mask data preparation 852 and during mask fabrication 844, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in the semiconductor wafer, in an etching process to form various etching regions in the semiconductor wafer, and/or in other suitable processes.

IC fab 840 is an IC fabrication business that includes one or more manufacturing facilities for the fabrication of a variety of different IC products. In some embodiments, IC Fab 840 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 840 uses the mask (or masks) fabricated by mask house 830 to fabricate IC device 860. Thus, IC fab 840 at least indirectly uses IC design layout 822 to fabricate IC device 860. In some embodiments, a semiconductor wafer 842 is fabricated by IC fab 840 using the mask (or masks) to form IC device 860. Semiconductor wafer 842 includes a silicon substrate or other proper substrate having material layers formed thereon. Semiconductor wafer further includes one or more of various doped regions, dielectric features, multilevel interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to a multi-bit flip-flop. In some embodiments, the multi-bit flip-flop includes a first flip-flop, a second flip-flop and a first inverter. In some embodiments, the first flip-flop has a first driving capability, and includes a first reset pin configured to receive a first reset signal. In some embodiments, the second flip-flop has a second driving capability different from the first driving capability. In some embodiments, the second flip-flop includes a second reset pin configured to receive the first reset signal, and the first reset pin and the second reset pin are coupled together. In some embodiments, the first inverter is configured to receive a first clock signal on a first clock pin, and configured to generate a second clock signal inverted from the first clock signal. In some embodiments, the first flip-flop and the second flip-flop are configured to share at least the first clock pin.

Another aspect of this description relates to a method of forming an integrated circuit. In some embodiments, the method includes placing, by a processor, a standard cell layout of the integrated circuit, and manufacturing the integrated circuit based on the standard cell layout. In some embodiments, the placing of the standard cell layout includes performing a first timing analysis of a first multi-bit flip-flop, the first multi-bit flip-flop includes a first set of flip-flops, each flip-flop in the first set of flip-flops having a first driving current capability. In some embodiments, the placing of the standard cell layout further includes upsizing a second set of flip-flops in at least the first multi-bit flip-flop in response to performing the first timing analysis, the second set of flip-flops having a second driving current capability different from the first driving current capability. In some embodiments, the placing of the standard cell layout further includes manufacturing the integrated circuit based on the standard cell layout.

Yet another aspect of this description relates to a system for designing an integrated circuit. In some embodiments, the system includes a non-transitory computer readable medium configured to store non-transitory instructions; and a processor coupled to the non-transitory computer readable medium. In some embodiments, the processor is configured to execute the non-transitory instructions including performing a first timing analysis of a first multi-bit flip-flop, the first multi-bit flip-flop includes a first set of flip-flops, each flip-flop in the first set of flip-flops having a first driving current capability. In some embodiments, the processor is configured to execute the non-transitory instructions further including upsizing a second set of flip-flops in at least the first multi-bit flip-flop in response to performing the first timing analysis, the second set of flip-flops having a second driving current capability different from the first driving current capability. In some embodiments, the processor is configured to execute the non-transitory instructions further including performing a second timing analysis of each flip-flop in the second set of flip-flops.

A number of embodiments have been described. It will nevertheless be understood that various modifications may be made without departing from the spirit and scope of the disclosure. For example, various transistors being shown as a particular dopant type (e.g., N-type or P-type Metal Oxide Semiconductor (NMOS or PMOS)) are for illustration purposes. Embodiments of the disclosure are not limited to a particular type. Selecting different dopant types for a particular transistor is within the scope of various embodiments. The low or high logical value of various signals used in the above description is also for illustration. Various embodiments are not limited to a particular logical value when a signal is activated and/or deactivated. Selecting different logical values is within the scope of various embodiments. In various embodiments, a transistor functions as a switch. A switching circuit used in place of a transistor is within the scope of various embodiments. In various embodiments, a source of a transistor can be configured as a drain, and a drain can be configured as a source. As such, the term source and drain are used interchangeably. Various signals are generated by corresponding circuits, but, for simplicity, the circuits are not shown.

Various figures show capacitive circuits using discrete capacitors for illustration. Equivalent circuitry may be used. For example, a capacitive device, circuitry or network (e.g., a combination of capacitors, capacitive elements, devices, circuitry, or the like) can be used in place of the discrete capacitor. The above illustrations include exemplary operations or steps, but the steps are not necessarily performed in the order shown. Steps may be added, replaced, changed order, and/or eliminated as appropriate, in accordance with the spirit and scope of disclosed embodiments.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A multi-bit flip-flop comprising:
a first flip-flop having a first driving capability, the first flip-flop including a first reset pin configured to receive a first reset signal;
a second flip-flop having a second driving capability different from the first driving capability, the second flip-flop including a second reset pin configured to receive the first reset signal, and the first reset pin and the second reset pin are coupled together; and
a first inverter configured to receive a first clock signal on a first clock pin, and configured to generate a second clock signal inverted from the first clock signal;
wherein the first flip-flop and the second flip-flop are configured to share at least the first clock pin.

2. The multi-bit flip-flop of claim 1, wherein
the first driving capability is based on the first flip-flop having a first number of fins; and
the second driving capability is based on the second flip-flop having a second number of fins.

3. The multi-bit flip-flop of claim 2, wherein the first number of fins is different from the second number of fins.

4. The multi-bit flip-flop of claim 1, wherein
the first driving capability is based on the first flip-flop having a first threshold voltage; and
the second driving capability is based on the second flip-flop having a second threshold voltage.

5. The multi-bit flip-flop of claim 4, wherein the first threshold voltage is different from the second threshold voltage.

6. The multi-bit flip-flop of claim 1, wherein at least one of the first flip-flop or the second flip-flop is a an SR flip-flop, a DQ flip-flop, JK flip-flop or a T-flip-flop.

7. The multi-bit flip-flop of claim 1, further comprising:
a third flip-flop having the first driving capability,
wherein the third flip-flop is configured to share the first clock pin with the first flip-flop and the second flip-flop.

8. The multi-bit flip-flop of claim 7, further comprising:
a fourth flip-flop including a second clock pin configured to receive the first clock signal, the fourth flip-flop having the second driving capability.

9. The multi-bit flip-flop of claim 1, wherein
the first flip-flop further includes a first data input pin configured to receive a first data signal; and
the second flip-flop further includes a second data input pin configured to receive a second data signal.

10. The multi-bit flip-flop of claim 9, wherein
the first flip-flop includes:
a first set pin configured to receive a first set signal; and
the second flip-flop includes:
a second set pin configured to receive the first set signal, and the first set pin and the second set pin are coupled together.

11. A method of forming an integrated circuit, the method comprising:
placing, by a processor, a standard cell layout of the integrated circuit, the placing of the standard cell layout comprising:
performing a first timing analysis of a first multi-bit flip-flop, the first multi-bit flip-flop includes a first set of flip-flops, each flip-flop in the first set of flip-flops having a first driving current capability;

upsizing a second set of flip-flops in at least the first multi-bit flip-flop in response to performing the first timing analysis, the second set of flip-flops having a second driving current capability different from the first driving current capability; and manufacturing the integrated circuit based on the standard cell layout.

12. The method of claim 11, wherein each flip-flop in the second set of flip-flops has a corresponding timing violation in the first timing analysis.

13. The method of claim 11, further comprising:
upsizing a third set of flip-flops in the second set of flip-flops in response to performing a second timing analysis of each flip-flop in the second set of flip-flops,
wherein the third set of flip-flops have a third driving current capability different from the first driving current capability and the second driving current capability, and
each flip-flop in the third set of flip-flops has a corresponding timing violation in the second timing analysis.

14. The method of claim 11, wherein
each flip-flop in the first multi-bit flip-flop with the first driving current capability has a first threshold voltage,
each flip-flop in the second set of flip-flops has a second threshold voltage, and
the first threshold voltage is different from the second threshold voltage.

15. The method of claim 11, wherein
each flip-flop in the first multi-bit flip-flop with the first driving current capability has a first number of fins,
each flip-flop in the second set of flip-flops has a second number of fins, and
the first number of fins is different from the second number of fins.

16. A system for designing an integrated circuit, the system comprises:
a non-transitory computer readable medium configured to store non-transitory instructions; and
a processor coupled to the non-transitory computer readable medium, wherein the processor is configured to execute the non-transitory instructions for:
performing a first timing analysis of a first multi-bit flip-flop, the first multi-bit flip-flop includes a first set of flip-flops, each flip-flop in the first set of flip-flops having a first driving current capability;
upsizing a second set of flip-flops in at least the first multi-bit flip-flop in response to performing the first timing analysis, the second set of flip-flops having a second driving current capability different from the first driving current capability; and
performing a second timing analysis of each flip-flop in the second set of flip-flops.

17. The system of claim 16, wherein the processor is configured to execute the non-transitory instructions where
the first driving current capability is based on the first set of flip-flops having a first threshold voltage,
the second driving current capability is based on the second set of flip-flops having a second threshold voltage, and
the first threshold voltage is different from the second threshold voltage.

18. The system of claim 16, wherein the processor is configured to execute the non-transitory instructions where
the first driving current capability is based on the first set of flip-flops having a first number of fins,
the second driving current capability is based on the second set of flip-flops having a second number of fins, and
the first number of fins is different from the second number of fins.

19. The system of claim 16, wherein the processor is configured to execute the non-transitory instructions further comprising:
upsizing a third set of flip-flops in the second set of flip-flops in response to performing the second timing analysis,
wherein the third set of flip-flops have a third driving current capability different from the first driving current capability and the second driving current capability, and each flip-flop in the third set of flip-flops has a corresponding timing violation in the second timing analysis.

20. The system of claim 16, wherein the processor is configured to execute the non-transitory instructions where
each flip-flop in the second set of flip-flops has a corresponding timing violation in the first timing analysis.

* * * * *